United States Patent
Zhao et al.

(10) Patent No.: US 11,960,828 B2
(45) Date of Patent: Apr. 16, 2024

(54) METHOD AND APPARATUS FOR MAPPING PROCESSING

(71) Applicants: Chenyi Zhao, Beijing (CN); Kunlun Yao, Chicago, IL (US)

(72) Inventors: Chenyi Zhao, Beijing (CN); Kunlun Yao, Chicago, IL (US)

(73) Assignees: Chenyi Zhao, Beijing (CN); Kunlun Yao, Chicago, IL (US)

( * ) Notice: Subject to any disclaimer, the term of this patent is extended or adjusted under 35 U.S.C. 154(b) by 0 days.

(21) Appl. No.: 17/958,067

(22) Filed: Sep. 30, 2022

(65) Prior Publication Data
US 2024/0070381 A1 Feb. 29, 2024

(30) Foreign Application Priority Data

Aug. 25, 2022 (CN) .......................... 202211029727.3

(51) Int. Cl.
*G06F 17/00* (2019.01)
*G06F 7/14* (2006.01)
*G06F 40/174* (2020.01)
*G06F 40/18* (2020.01)

(52) U.S. Cl.
CPC .............. *G06F 40/174* (2020.01); *G06F 7/14* (2013.01); *G06F 40/18* (2020.01)

(58) Field of Classification Search
CPC .......... G06F 40/174; G06F 7/14; G06F 40/18
USPC ...................................................... 715/212
See application file for complete search history.

(56) References Cited

U.S. PATENT DOCUMENTS

| | | | | |
|---|---|---|---|---|
| 10,235,435 | B2* | 3/2019 | Mueller | G06F 16/252 |
| 10,586,611 | B2* | 3/2020 | Tiwari | G06F 16/221 |
| 2005/0289450 | A1* | 12/2005 | Bent | G06F 16/248 |
| | | | | 707/999.1 |
| 2008/0104498 | A1* | 5/2008 | Molander | G06F 40/18 |
| | | | | 715/212 |
| 2009/0248710 | A1* | 10/2009 | McCormack | G06F 16/288 |
| 2009/0282324 | A1* | 11/2009 | Patel | G06F 40/186 |
| | | | | 715/212 |
| 2012/0016772 | A1* | 1/2012 | Sadagopan | G06Q 30/02 |
| | | | | 707/767 |
| 2012/0173226 | A1* | 7/2012 | McEvoy | G06F 16/221 |
| | | | | 707/802 |

(Continued)

OTHER PUBLICATIONS

Sharma, 'Automatically Converting Tabular Data to RDF: An Ontological Approach', International Journal of Web & Semantic Technology vol. 6. No. 3, Jul. 2015 (Year: 2015).*

*Primary Examiner* — Stephen S Hong
*Assistant Examiner* — Matthew J Ludwig
(74) *Attorney, Agent, or Firm* — Seed IP Law Group LLP

(57) ABSTRACT

Embodiments of the present disclosure relate to a method and apparatus for mapping processing. The method comprises acquiring a first table and a second table, and determining a first header of the first table and a second header of the second table based on received attribute setting information. The method further comprises acquiring a group of column names from the first header and the second header, wherein the group of column names includes a first column name in the first table and a second column name in the second table. The method also comprises mapping the group of column names to a mapped column name; merging the first table and the second table based on the mapped column name and outputting a merged table.

18 Claims, 13 Drawing Sheets

(56) References Cited

U.S. PATENT DOCUMENTS

2014/0173402 A1* 6/2014 Bastide ................ G06F 40/177
                                                         715/219
2020/0175267 A1* 6/2020 Schäfer ................ G06V 30/413
2021/0200736 A1* 7/2021 Luo ....................... G06F 16/254

* cited by examiner

Table T1

| | A | B | C | D | E |
|---|---|---|---|---|---|
| 2 | Image title | Image size | Resolution | DPI | Image set |
| 3 | Image 1 | 95 | 644×644 | 96 | 1 |
| 4 | Image 2 | 420 | 1600×1067 | 300 | 1 |
| 5 | Image 3 | 624 | 1600×1283 | 300 | 2 |
| 6 | Image 4 | 196 | 1600×1067 | 300 | 2 |
| 7 | Image 5 | 64 | 640×640 | 96 | 1 |

Fig. 4A

Table T2

| | B | C | D | E | F |
|---|---|---|---|---|---|
| 2 | Image title | Size | Resolution | DPI | Image set |
| 3 | Image 6 | 12 | 200×200 | 300 | 3 |
| 4 | Image 7 | 28 | 400×400 | 96 | 3 |
| 5 | Image 8 | 1180 | 1920×1080 | 300 | 4 |
| 6 | Image 9 | 300 | 912×701 | 300 | 2 |
| 7 | Image 10 | 36 | 576×384 | 96 | 2 |
| 8 | Image 11 | 976 | 1920×1080 | 300 | 4 |

Fig. 4B

Table T10

| | A | B | C | D | E | F | G |
|---|---|---|---|---|---|---|---|
| | | | Resolution | | DPI | | |
| 1 | Image title | Image size | Width | Height | Horizontal | Vertical | Image set |
| 2 | | | | | | | |
| 3 | | | | | | | |
| 4 | Image 1 | 95 | 644 | 644 | 96 | 96 | 1 |
| 5 | Image 2 | 420 | 1600 | 1067 | 300 | 300 | 1 |
| 6 | Image 3 | 624 | 1600 | 1283 | 300 | 300 | 2 |
| 7 | Image 4 | 196 | 1600 | 1067 | 300 | 300 | 2 |
| 8 | Image 5 | 64 | 640 | 640 | 96 | 96 | 1 |

Table T20

| | A | B | C | D | E | F | G |
|---|---|---|---|---|---|---|---|
| | | | Resolution | | Dots per inch (DPI) | | |
| 12 | Image name | Size | Width | Height | Horizontal | Vertical | Image set |
| 13 | | | | | | | |
| 14 | | | | | | | |
| 15 | Image 6 | 12 | 200 | 200 | 300 | 300 | 3 |
| 16 | Image 7 | 28 | 400 | 400 | 96 | 96 | 3 |
| 17 | Image 8 | 1180 | 1920 | 1920 | 300 | 300 | 4 |
| 18 | Image 9 | 300 | 912 | 701 | 96 | 96 | 2 |
| 19 | Image 10 | 36 | 576 | 384 | 96 | 96 | 2 |

Fig. 10

METHOD AND APPARATUS FOR MAPPING PROCESSING

FIELD

Embodiments of the present disclosure relate to the technical field of computer science, and more particularly, to a method and apparatus for mapping processing, a computing device, a computer-readable storage medium, and a computer program product thereof.

BACKGROUND

With the popularization and development of computer science and technology, spreadsheets and tables are widely used during data processing. Data consolidation is an important step during data processing. By merging different spreadsheets, the consolidation of data in different spreadsheets may be implemented, thereby providing a basis for subsequent works such as data analysis and processing.

SUMMARY

In view of this, the embodiments of the present disclosure propose a method and apparatus for mapping processing, a computing device, a computer-readable storage medium, and a computer program product.

According to a first aspect of the present disclosure, a method for processing data is provided. The method includes: acquiring a first table and a second table; determining a first header of the first table and a second header of the second table based on received attribute setting information; acquiring a group of column names from the first header and the second header, wherein the group of column names includes a first column name in the first table and a second column name in the second table; mapping the group of column names to a mapped column name; merging the first table and the second table based on the mapped column name; and outputting a merged table.

According to a second aspect of the present disclosure, a computing device is provided, including at least one processing unit and at least one memory, wherein the at least one memory is coupled to the at least one processing unit and stores an instruction executed by the at least one processing unit, and when executed by the at least one processing unit, the instruction causes the computing device to execute the method according to the first aspect of the present disclosure.

According to a third aspect of the present disclosure, a computer-readable storage medium is provided, including a machine-executable instruction, wherein when executed by a device, the machine-executable instruction causes the device to execute the method according to the first aspect of the present disclosure.

According to a fourth aspect of the present disclosure, a computer program product is provided, including a machine-executable instruction, wherein when executed by a device, the machine-executable instruction causes the device to execute the method according to the first aspect of the present disclosure.

The Summary is provided to introduce selection for concepts in a simplified form, and the concepts will be further described below in the Detailed Description. The Summary is not intended to identify key features or essential features of the present disclosure, nor is it intended to limit the scope of the present disclosure.

BRIEF DESCRIPTION OF THE DRAWINGS

The above and other objectives, features and advantages of the present disclosure will become more apparent from the more detailed description of exemplary embodiments of the present disclosure in combination with drawings, wherein the same reference signs usually refer to the same components in the exemplary embodiments of the present disclosure.

FIGS. 4A and 4B show a schematic diagram of an example table to be merged;

FIG. 10 shows an example table to be merged having a multi-layer header;

DETAILED DESCRIPTION

Figure 1:
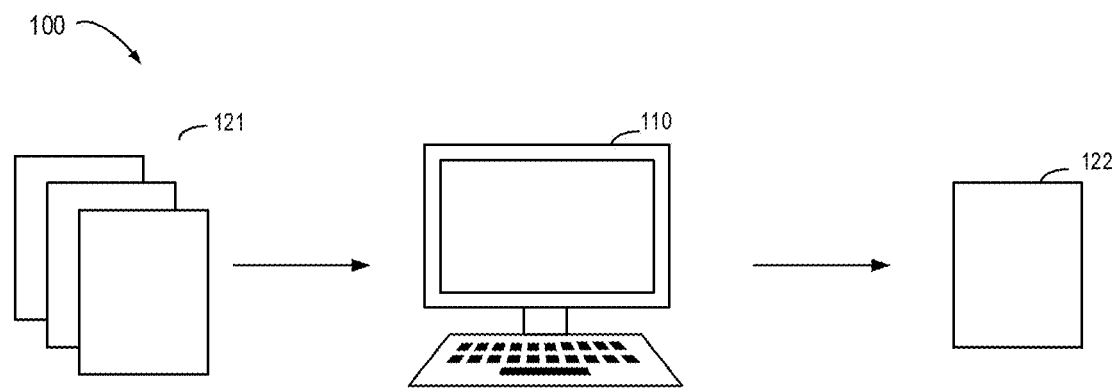
FIG. 1 shows a schematic diagram of an example environment in which multiple embodiments of the present disclosure may be implemented.

Preferred embodiments of the present disclosure will be described below in more detail with reference to the drawings. Although the preferred embodiments of the present disclosure are shown in the drawings, it should be understood that the present disclosure may be implemented in various forms and should not be limited to the embodiments set forth herein. These embodiments are provided for a more thorough and complete understanding of the present disclosure on the contrary, and may fully convey the scope of the present disclosure to those skilled in the art.

The term "including", "comprising" and variations thereof as used herein mean open-ended inclusions, that is, "including but not limited to". The term "or" means "and/or" unless specifically stated otherwise. The term "based on" means "at least partially based on". The terms "one example embodiment" and "one embodiment" mean "at least one example embodiment". The term "another embodiment" means "at least one additional embodiment." The terms "first", "second" and the like may refer to different or the same objects. Other explicit and implicit definitions may also be included below.

It should be noted that, the numbers or numerical values used herein are all for the convenience of understanding the technology of the present disclosure, rather than limiting the scope of the present disclosure.

With the popularization and development of computer science and technology, spreadsheets and tables are applied to data processing more and more widely. Data consolidation is an important step during data processing. By merging different spreadsheets, the consolidation of data in different spreadsheets may be implemented, thereby providing a basis for subsequent works such as data analysis and processing.

Usually, the amount of data to be processed is very large; accordingly, the number of tables to be merged is relatively large. Tables processed by different users may have inconsistent column names. For example, a table 1 processed by a user A has a column name "image size", while the column name in a table 2 that is processed by a user B is "image dimension". Data in columns corresponding to the column name "image size" and data in columns corresponding to the column name "image dimension" are consistent (i.e., data in both the columns indicates the size of an image). However, due to the inconsistent column names, in order to merge the table 1 and the table 2, the user needs to manually modify the column names in the tables to make the column names consistent, for example, unifying the column names into either "image size" or "image dimension". Otherwise problems such as a merging error occur.

In view of this, an embodiment of the present disclosure provides a technology for mapping processing. Compared with the prior art, the method according to the embodiment of the present disclosure may automatically implement mapping of inconsistent column names in a plurality of tables where data is located. The method according to the embodiment of the present disclosure includes: acquiring a group of column names from a plurality of tables based on a received attribute setting, wherein the group of column names is stored in a cache file. The method further includes: generating a mapping file and an address file in response to a mapping setup operation for the group of column names, wherein the mapping file stores a mapping relationship between the group of column names and a mapped column name for the group of column names, and wherein the address file stores an address of the mapped column name in the cache file. The method further includes: outputting the mapped column name in response to a mapping application operation and based on the mapping file, the address file and the cache file. Based on this manner, the technology according to the embodiment of the present disclosure can conveniently map inconsistent column names among a plurality of different tables to a consistent mapped column name, without the need for the user to manually modify and unify the column names before merging the tables. Therefore, the efficiency and speed of merging the tables are greatly improved, and the experience of the user can be significantly improved.

FIG. 1 shows a schematic diagram of an example environment 100 in which multiple embodiments of the present disclosure may be implemented. The environment 100 includes a computing device 110. The computing device 110 may include any device with computing capability, such as a personal computer, a tablet computer, a wearable device, a smart home device, a cloud server, a mainframe, a distributed computing system, and the like. The computing device 110 may include a single device, or a cluster composed of a plurality of devices.

According to an embodiment of the present disclosure, the computing device 110 may be used for mapping processing. For example, the computing device 110 may merge multiple tables 121, perform mapping processing on inconsistent column names in the multiple tables during a merging process, and output a merged table 122. The tables may include spreadsheets in various formats, such as Excel tables, CSV tables, and so on. The forms of the spreadsheets are not limited in the present disclosure.

In one embodiment, in the process of merging tables, the computing device 110 may acquire a first table to be merged and a second table to be merged. The computing device 110 determines a first header of the first table and a second header of the second table based on at least one attribute setting. The computing device 110 may also acquire a group of column names from the first header and the second header, wherein the group of column names includes a first column name in the first table and a second column name in the second table. The computing device 110 maps the group of column names to a mapped column name, merges the first table and the second table based on the mapped column name, and then outputs a merged table.

It should be understood that, the environment 100 shown in FIG. 1 is merely an example in which embodiments of the present disclosure may be implemented, and is not intended to limit the scope of the present disclosure. The embodiments of the present disclosure are equally applicable to other systems or architectures.

Figure 2A:
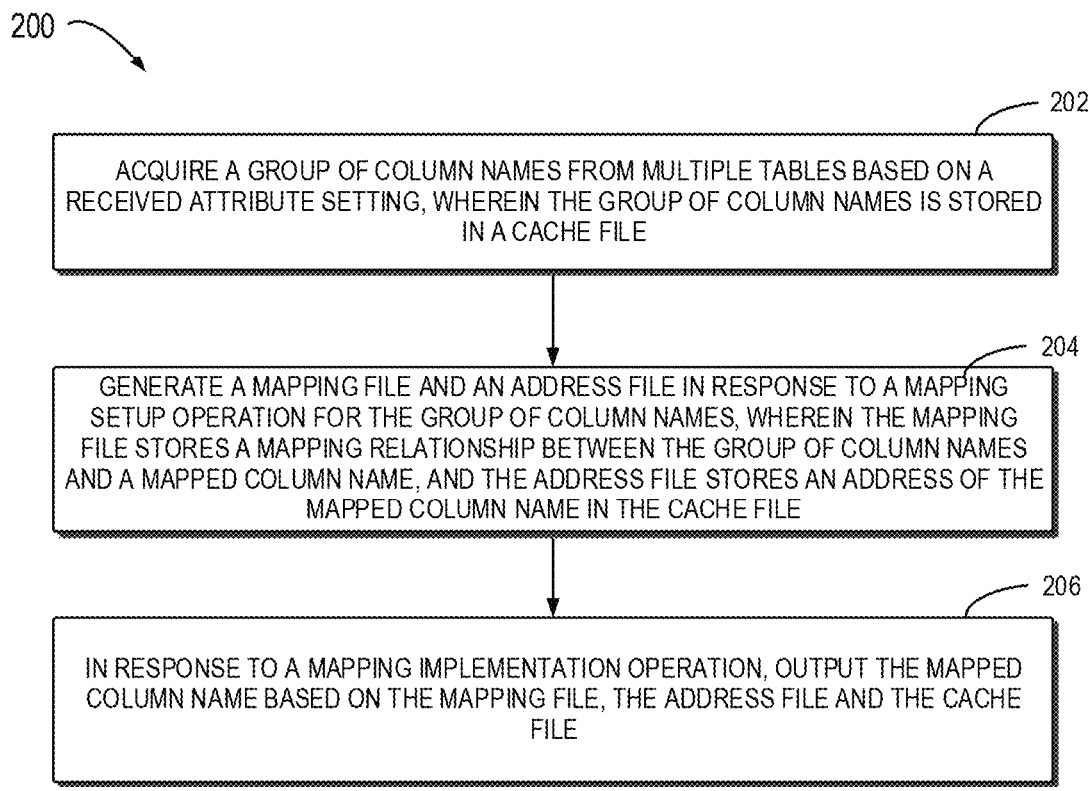
FIG. 2A shows a schematic flow diagram of a process for mapping according to an embodiment of the present disclosure.

A flow diagram of a method 200 for mapping processing according to an embodiment of the present disclosure will be described below in combination with FIG. 2A. The method 200 may be executed by the computing device 110 as shown in FIG. 1. The method 200 may be also executed by any suitable computing devices. In an embodiment, the method 200 for mapping processing according to the embodiment of the present disclosure may be applied to a scenario of merging a plurality of tables in which data may be located. The method 200 will be described below in combination with the scenario of merging the tables. It should be understood that, the method 200 for mapping processing according to embodiments of the present disclosure may also be applied to any other scenarios of performing consistency mapping on the data, which is not limited in the present disclosure.

In block 202, the computing device 110 acquires a group of column names from multiple tables based on at least one received attribute setting, wherein the group of column names is stored in a cache file.

In one embodiment, the computing device 110 may acquire multiple tables to be merged, for example, a first table T1 and a second table T2, so as to process data stored in the tables. In one embodiment, each table may include a header area and a data area. The data area includes multiple cells for storing data. The header area includes multiple cells, and fields filled in these cells indicate the column names of corresponding columns, respectively. It may be understood that, a sheet in a file (e.g., Excel file) may include one table, and may also include multiple tables. A header area may be used to determine a table, and distinguish a table from multiple tables. The computing device 110 may receive at least one attribute setting, and acquire a group of column names $S_{name}$ from multiple tables (e.g., the tables T1 and T2) based on the received attribute settings.

In one embodiment, the attribute settings include settings for the header (e.g., starting row number setting and ending row number setting) of one of the multiple tables. The attribute settings may also include a designation of a common column name among the column names of the multiple tables. The computing device 110 may determine a header of each table based on the attribute settings, and acquire a group of column names $S_{name}$ from determined headers.

In one embodiment, the group of column names $S_{name}$ may include a first column name $C_{name1}$ in the first table T1 and a second column name $C_{name2}$ in the second table T2. Data in the columns corresponding to the first column name $C_{name1}$ and data in the columns corresponding to the second column name $C_{name2}$ have the same indication; e.g., both indicating an image size, but the first column name $C_{name1}$ is different from the second column name $C_{name2}$.

It should be understood that, although the tables T1 and T2 are used as examples for description above, those skilled in the art should understand that the number of tables to be merged is not limited. Accordingly, each column name in the column name group may be derived from respective columns in respective tables.

In block 204, in response to a mapping setup operation for the group of column names, the computing device 110 generates a mapping file and an address file, wherein the mapping file stores a mapping relationship between the group of column names and a mapped column name for the group of column names, and the address file stores an address of the mapped column name in the cache file.

In one embodiment, the computing device 110 may receive the mapping setup operation (e.g., triggering a mapping operation control (e.g., Mapping Tool) performed by a user), the mapping setup operation is used for starting a mapping operation, so as to map the inconsistent column names in a group of column names to a mapped column name $C_{name}$. In response to the mapping setup operation for the group of column names, the computing device 110 may generate a mapping file $File_{map}$ and an address file $File_{addr}$. The mapping file $File_{map}$ stores a mapping relationship between the group of column names and the mapped column name. The address file $File_{addr}$ stores the address of the mapped column name in the cache file. In one embodiment, the mapping relationship includes the mapped column name. In addition, the mapping relationship further includes an association relationship between the mapped column name and the group of column names. For example, according to the mapping setup operation, a mapping relationship R1 is stored in the mapping file $File_{map}$. The mapping relationship R1 indicates that both the first column name $C_{name1}$ and the second column name $C_{name2}$ in the group of column names $S_{name}$ are mapped to the column Name $C_{name}$, so that consistency mapping of the group of column names may be implemented.

In block 206, in response to a mapping implementation operation, the computing device 110 outputs the mapped column name abased on the mapping file, the address file and the cache file.

In one embodiment, the computing device 110 may receive the mapping implementation operation, which represents a confirmation from the user on the mapping operation. The user may provide the mapping implementation operation by means of an interactive component, such as a control in an application user interface. In response to the mapping implementation operation, the computing device 110 may output the mapped column name based on the mapping file, the address file and the cache file. In one embodiment, the computing device 110 may display the mapped column name in the user interface, which will be described in detail below in combination with FIG. 2B.

Figure 2B:
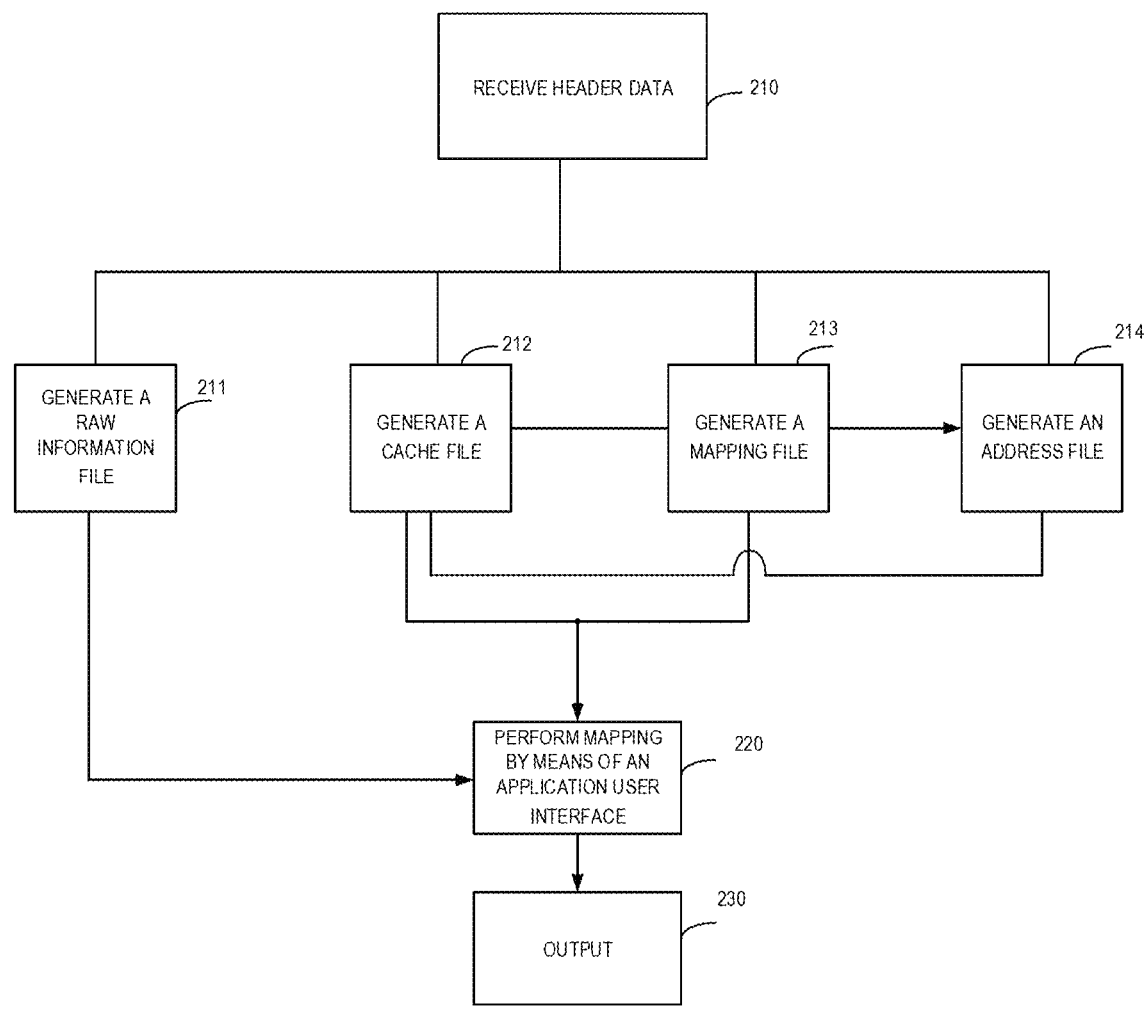
FIG. 2B shows a schematic flow diagram of performing mapping based on multiple files associated with mapping processing according to an embodiment of the present disclosure.

FIG. 2B shows a schematic diagram of performing mapping based on multiple files according to an embodiment of the present disclosure. In block 210, the computing device 110 receives header data of the tables to be merged, and generates the cache file based on the received data (as shown in block 212). The cache file stores column name related information of the tables to be merged. In one embodiment, as described above, both the first column name $C_{name1}$ and the second column name $C_{name2}$ in the column name group $S_{name}$ are stored in the cache file and have respective addresses addr1 and addr2 in the cache file. In one embodiment, in response to the mapping setup operation, the computing device 110 determines the mapped column name to which the first column name $C_{name1}$ and the second column name $C_{name2}$ are mapped. The mapped column name may be selected from the first column name $C_{name1}$ and the second column name $C_{name2}$. For example, the first column name $C_{name1}$ may be selected as the mapped column name. The computing device 110 generates the mapping file (as shown in block 213) and generates the address file (as shown in block 214). The computing device 110 stores the mapping relationship of the first column name $C_{name1}$ and the second column name $C_{name2}$ with the mapped column names $C_{name}$ (in the present embodiment, the first column name $C_{name1}$ may be the mapped column names $C_{name}$) to which the first and second column names are mapped. The computing device 110 further stores address information of the mapped column name $C_{name}$ in the cache file, for example, first address information addr1. In one embodiment, the mapping relationship includes the mapped column name. In addition, the mapping relationship further includes an association relationship between the mapped column name and the group of column names. It should be understood that, although two column names are used as an example to describe the column name group, the column name group according to embodiment of the present disclosure does not limit the number of column names in the group.

In one embodiment, the mapping file is stored in association with the address file. Specifically, the mapping file and the address file have the same format, and respectively store the mapped column name and the address of the mapped column name in the cache file. For example, the mapping file may include a mapping table, and the address file may include an address table. The mapping table has the same format as the address table. The mapping table stores the mapped column name at a first position in the mapping table, and the address table stores the address of the mapped column name in the cache file at a second position, which corresponds to the first position. In addition, it may be understood that, the mapping file and the address file may also have other formats than tables, which is not limited in the present disclosure.

Upon receiving the mapping implementation operation (e.g., mapping is performed in block 220 by means of the application user interface), the computing device 110 determines to store the mapped column name $C_{name}$ according to the mapping relationship in the mapping file, retrieves the mapped column name from the cache file according to the address information (e.g., the first address information addr1) of the mapped column name $C_{name}$ that is stored in the address file, and outputs the mapped column name (as shown in block 230), thereby prompting the user that the group of column names is mapped to the mapped column name.

In addition, in one embodiment, the computing device 110 may also generate a raw information file according to the header data of the tables to be merged, so as to store raw information of the tables to be merged. The raw information may include original header information of the tables, etc. The computing device 110 may, in response to a selection from the user for a viewing operation, display raw information of the table that is associated with the selected column name. The viewing operation of the raw information will be described in more detail with reference to FIG. 8.

It may be understood that, the table merging process employing the mapping processing as described in the present disclosure may be implemented as an application program and provided for the user, which facilitates data processing. The data processing method according to embodiment of the present disclosure will be described below in combination with an exemplary application user interface.

Figure 3:
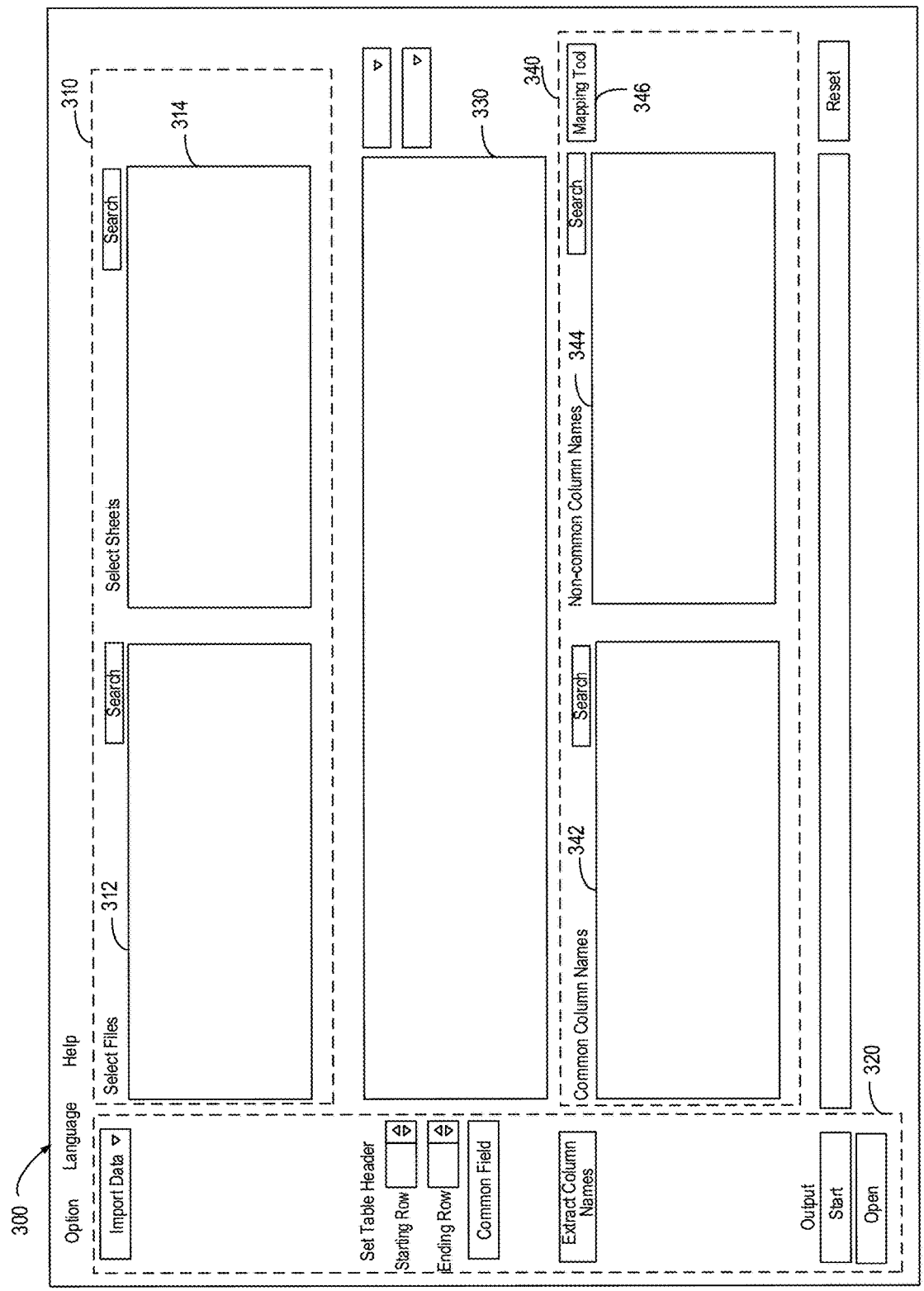
FIG. 3 shows a schematic diagram of an application user interface employing the mapping processing according to an embodiment of the present disclosure.

FIG. 3 shows an exemplary user interface of an application employing mapping processing according to an embodiment of the present disclosure. The user interface may be used for merging tables, so as to implement data processing. The method for mapping processing according to the embodiment of the present disclosure is employed during the process of merging the tables. It may be understood that the user interface in FIG. 3 is merely exemplary.

FIG. 3 shows a user interface 300 of an application (APP) employing mapping processing according to an embodiment of the present disclosure. The APP may be installed in the computing device 110 for implementing a merging operation of multiple tables, so as to implement data processing. As shown in FIG. 3, the user interface 300 in FIG. 3 may include multiple display areas. For example, the user interface 300 may include an identifier display area 310. The identifier display area 310 may display identifiers of tables to be merged. The identifier display area 310 includes a file identifier display sub-area 312 and a table identifier display sub-area 314. The file identifier display sub-area 312 may display an identifier of a file, and the table identifier display sub-area 314 may display an identifier of a table in the files to be merged. The tables to be merged are located in the file. The user interface 300 also includes a table display area 330, which may display a table associated with a selected table identifier. The user interface 300 further includes a column name display area 340 that includes a common column name display sub-area 342 and a non-common column name display sub-area 344. The common column name display sub-area 342 may display a common column name in the tables to be merged, and the non-common column name display sub-area 344 may display a non-common column name in the tables to be merged (e.g., the group of column names as described above). In addition, the user interface 300 may further include a setting area 320 for receiving attribute settings provided by the user. For example, the attribute settings may include multiple settings from the user on the header of one of the tables to be merged, and a setting of common fields. A detailed operation process of the APP will be described below by taking a specific example as an example.

FIGS. 4A-4B show two exemplary tables T1 and T2. Image information is recorded in the two tables, including "image title (image name)", "image size (size)", "resolution", "DPI (dots per inch (DPI))", and "image set", which are represented by column names respectively. In one embodiment, the column name "image set" indicates an image set to which the images belong. Moreover, each table includes multiple rows, which may record the above-mentioned information of multiple images. In addition, according to the row numbers as shown in FIG. 4A and FIG. 4B, it can be seen that, the table T1 and the table T2 are located in two sheets, respectively. It may be understood that, the positions of the tables are not limited in the present disclosure. For example, multiple tables may be located in either different sheets or the same sheet. Different sheets may be distinguished according to table header areas. In the following descriptions, the table T1 in FIG. 4A and the table T2 in FIG. 4B will be taken as examples to describe the mapping processing method according to the embodiment of the present disclosure in combination with an application user interface 300 in FIG. 3. It may be understood that, although only two tables are illustrated in FIGS. 4A-4B, any number of tables may be implemented according to embodiments of the present disclosure. Furthermore, although image information is presented in the tables T1 and T2, it may be understood that tables recording any data may be processed according to embodiments of the present disclosure.

An operation process of merging the table T1 and the table T2 by employing the mapping processing according to the embodiment of the present disclosure will be schematically described below in combination with FIG. 5. The merged table may be used for data processing. An application to which a user interface 500 shown in FIG. 5 belongs is installed in the computing device 110, and accordingly, the computing device 110 may execute a merging operation on the tables T1 and T2.

Figure 5:
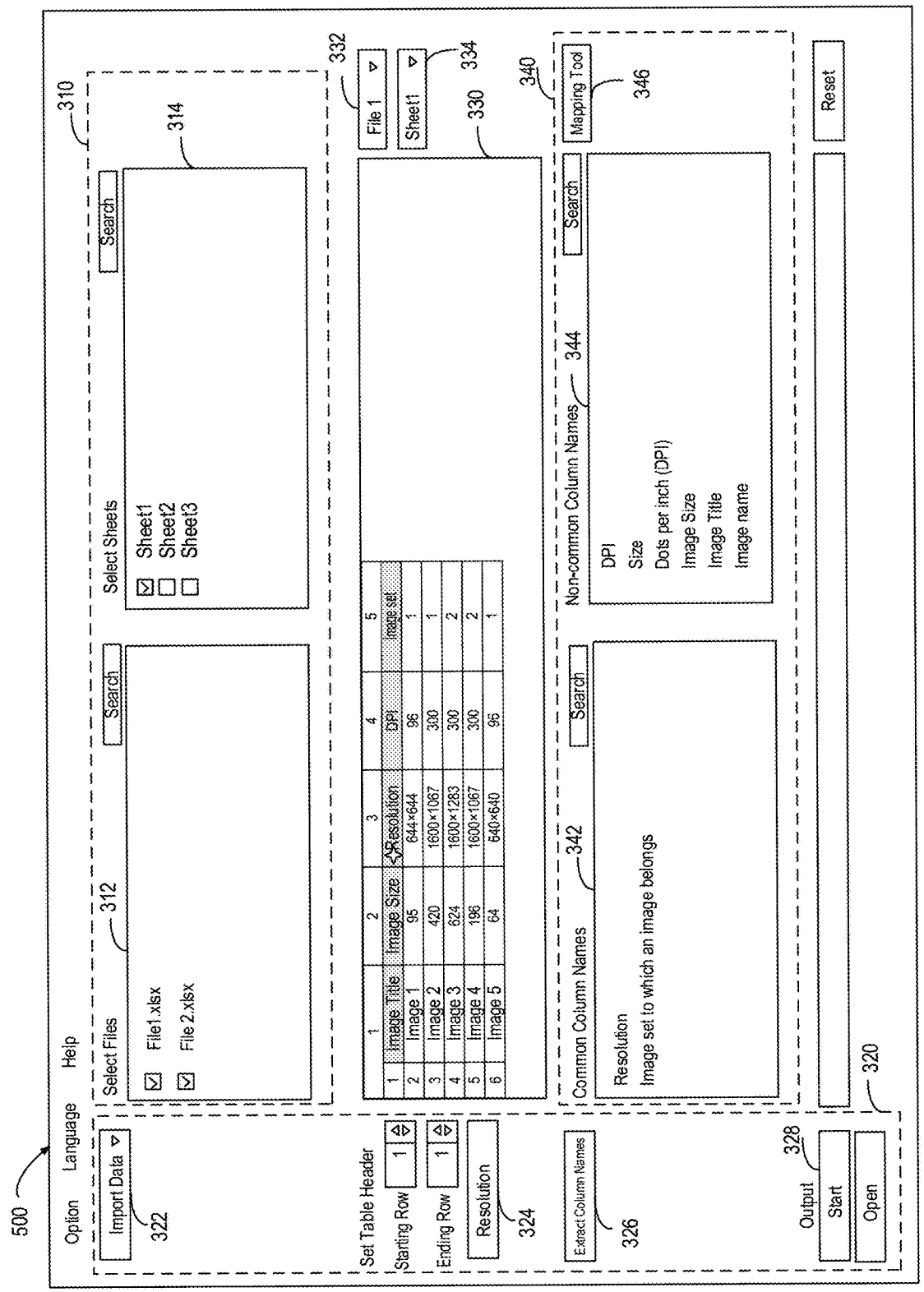
FIG. 5 shows a schematic diagram of an user interface during the use of the mapping processing according to an embodiment of the present disclosure.

As shown in FIG. 5, the computing device 110 acquires tables T1 and T2 to be merged. In one embodiment, the user may upload the tables T1 and T2 into the computing device 110 by triggering an "import data" control 322. Assuming that the table T1 is located in a sheet 1 of a file 1, and the table T2 is located in a sheet 1 of a file 2. After the tables T1 and T2 has been uploaded, file names (e.g., "file 1.xlsx" and "file 2.xlsx") are displayed in the file identifier display sub-area 312. In response to the selection from the user for a file in the file identifier display sub-area 312, a sheet name in the selected file is displayed in the sheet identifier display sub-area 314. In response to a selection from the user for a table identifier (e.g., a sheet name), which is associated with the table, in the sheet display sub-area 314, the computing device 110 displays, in the table display area 330, information of the table associated with the selected table identifier (e.g., the selected sheet name). For example, after receiving the selection from the user for the sheet 1 in the file 1, the computing device 110 displays, in the table display area 330, the information of the table T1. Further, relevant information of the table displayed in the table display area 330 may be displayed on the right side of the table display area, as shown by controls 332 and 334, which respectively display the file name (e.g., "file 1") and the sheet name (e.g., "sheet 1") of the table that is displayed in the table display area 330 currently. The user may also select other sheets, in e.g., other files, by operating the above controls 332 and 334 (e.g., pull-down selection), and the computing device 110 updates the table displayed in the table display area 330, in accordance with the selection.

The application user interface 500 in FIG. 5 is also provided with a setting area 320, which includes a table header setting sub-area for setting the header of the table. The table header setting sub-area includes a starting row setting control, an ending row setting control and a common field setting control 324. In one embodiment, the starting row setting control and the ending row setting control are used for setting a starting row and an ending row for table T1 that is currently displayed in the table display area 330, and the common field setting control 324 is used for setting a common field among the column names in the tables to be merged. In one embodiment, the common field includes common column names among the column names in the tables to be merged. For example, as shown in FIG. 5, the table T1 displayed in the table display area 330 has a row of headers with the row number of the header area is 1. Accordingly, the user may set both the starting row and the ending row of the table T1 to be "1" in the starting row control and the ending row control, respectively. In one embodiment, in response to the settings of the starting row and ending row, the computing device 110 may highlight the set table header area in the table display area 330, as shown by the table header of a gray area. Moreover, as shown in FIG. 4A and FIG. 4B, the common column names in the tables T1 and T2 are "resolution" and "image set". Accordingly, in order to accurately merge the tables, the user may input at least one of the common column names in the common field setting control 324. As shown in FIG. 5, the user may input "resolution" as the common field in the common field setting control 324. After the common field is determined, the computing device 110 may highlight the column name corresponding to the set common field in the interface 500. For example, the computing device 110 may highlight the column name by adding a display mark and the like, so as to prompt the user that the common column name is set to be the common field.

In response to receiving attribute settings of the header from the user, the computing device 110 may determine a first header 420 of the table T1 and a second header 440 of the table T2. The application user interface further includes a column name acquisition control (e.g., an "extract column name" control 326) for receiving a column name acquisition operation from the user. The computing device 110 receives a trigger operation from the user for the control 326, and acquires a group of column names from the first header 420 and the second header 440. For example, the group of column names includes a first column name from the table T1 and a second column name from the table T2. For example, taking FIG. 5 as an example, in response to receiving a trigger from the user for the "extract column name" control 326, the computing device 110 acquires a group of column names, wherein the group of column names may include a column name "image title" in the table T1 and a column name "image name" in the table T2. The column names in the group are from multiple tables, correspond to columns with data indicating the same category, but the column names are inconsistent from each other. In addition, the computing device 110 may also acquire another column name group from the tables T1 and T2. The column names in the another column name group respectively correspond to the columns with data indicating the same category That is to say, the computing device 110 groups the acquired column names in multiple columns.

As described above, the column name display area 340 includes the common column name display sub-area 342 and the non-common column name display sub-area 344. The common field "resolution" and other common column name "image set" between the table T1 and the table T2 are displayed in the common column name display sub-area 342. The non-common column names among the tables are displayed in the non-common column name display sub-area 344, and the non-common column names may refer to inconsistent column names. For example, the column name "image title" in the table T1 and the column name "image name" in the table T2 are displayed in the area 344, since the column name "image title" in the table T1 and the column name "image name" in the table T2 "are inconsistent.

Figure 6:
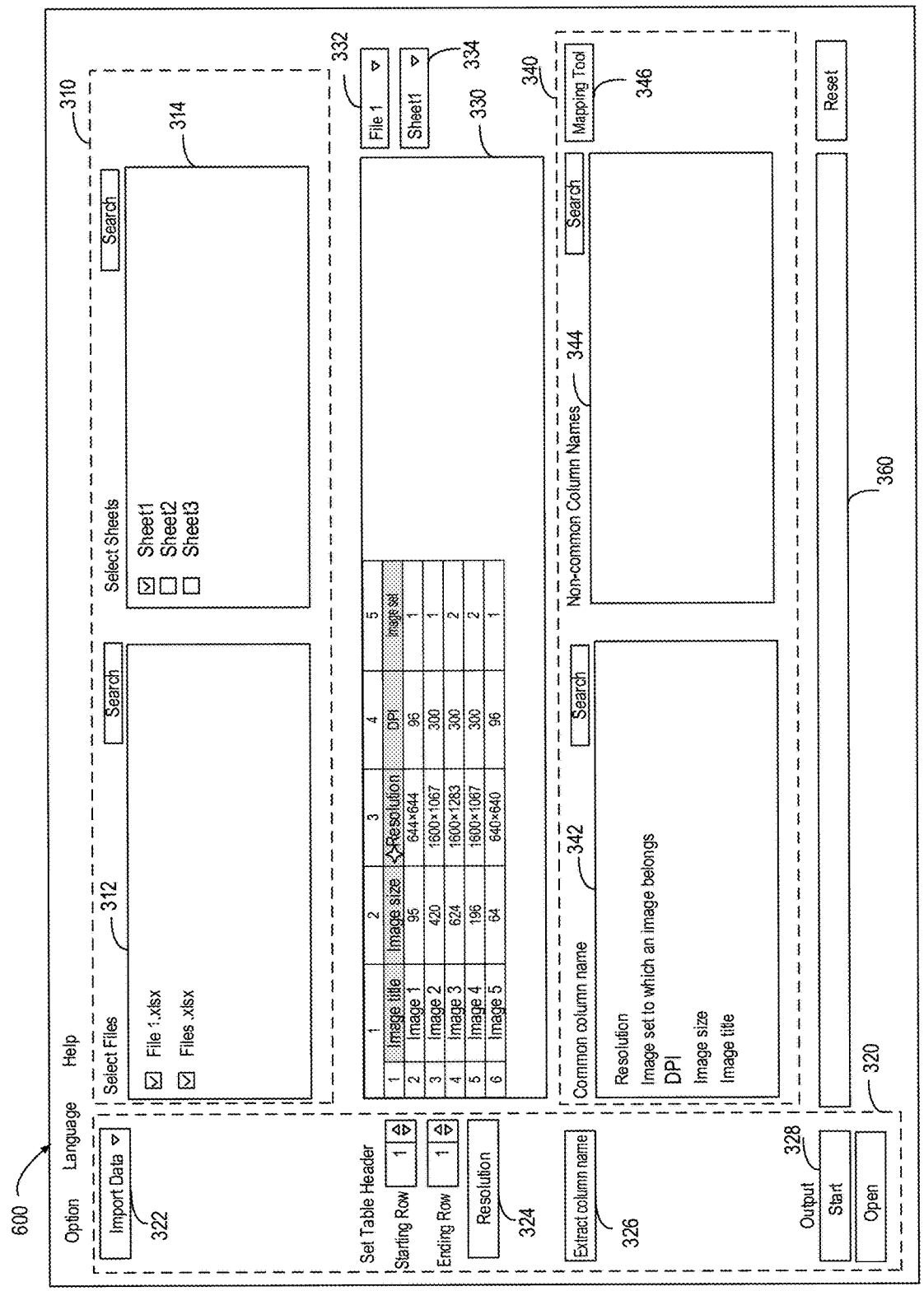
FIG. 6 shows a schematic diagram of an user interface after mapping is completed by an application employing the mapping processing according to an embodiment of the present disclosure.

In one embodiment, in order to unify the column names in the column name groups in the tables, the user may start a mapping operation. For example, the application user interface 500 in FIG. 5 is provided with a mapping operation startup control (e.g., a "Mapping Tool" control 346), and the user may trigger the control 346 to map the inconsistent column names in the column name groups to a consistent mapped column name. In one embodiment, based on the mapping startup operation of the user (e.g., the trigger of the "Mapping Tool" control 346 performed by the user), the computing device 110 may respectively map the inconsistent column names in the column name groups to respective mapped column names. For example, the column names "size" and "image size" in a group may be mapped to a mapped column name "image size"; the column names "DPI" and "dots per inch (DPI)" in a group may be mapped to "DPI"; and the column names "image name" and "image title" in a group may be mapped to "image name". In addition, various groups of consistent column names (e.g., the mapped column names) may be displayed in the common column name display sub-area 342. Since there is no inconsistent column name in the table T1 and the table T2 after the mapping process is completed, no column name is displayed in the non-common column name display sub-area 344, as shown in FIG. 6. With regard to the implementation process of mapping, reference may be made to the data processing process 200 in FIG. 2A, which will not be repeated herein for the sake of clarity.

FIG. 6 shows an application user interface 600 after the mapping process is completed. Compared with the interface in FIG. 5, the interface 600 in FIG. 6 shows the interface after the mapping operation is completed. The mapped column names, which are obtained by mapping the column name groups are displayed in the common column name display sub-area 342, and no column name information is displayed in the non-common column name display sub-area 344. The computing device 110 receives a merging operation instruction from the user (e.g., trigger of a "start" control 328 performed by the user), the computing device 110 merges the tables T1 and T2 based on the mapped column name. The computing device 110 may output the merged table. For example, the computing device 110 may save the merged table in a predetermined storage position in the computing device 110. The computing device 110 may also display the merged table in response to an operation for viewing the merged table from the user. In addition, the computing device 110 may also prompt the user of the progress of merging the tables through a progress indication component 360 disposed in the interface 600.

In one embodiment, when merging the tables T1 and T2, the computing device 110 may acquire a first column corresponding to the first column name (e.g., "image title") in table T1 based on the mapped column name (e.g., "image title"). The first column is column 410 as shown in FIG. 4A. The computing device 110 may also acquire a second column corresponding to the second column name (e.g., "image name") of the table T2 based on the mapped column name (e.g., "image title"). The second column is the column 430 as shown in FIG. 4B. The computing device 110 may merge the columns 410 and 430 to obtain a merged column, and the column name corresponding to the merged column is the mapped column name (e.g., "image title"). For other columns, the computing device 110 may execute a similar operation to obtain a merged column. Accordingly, the computing device 110 may obtain a merged table.

The operation process of merging tables is described above in combination with FIG. 3 to FIG. 6. The mapping processing method according to the embodiment of the present disclosure may be used for implementing mapping the column names during the process of merging the tables. Hereinafter, the mapping operation and the specific implementation method will be described in detail in combination with to FIG. 7. It should be understood that an interface in FIG. 7 is also exemplary, which is not limited in the present disclosure.

Figure 7:
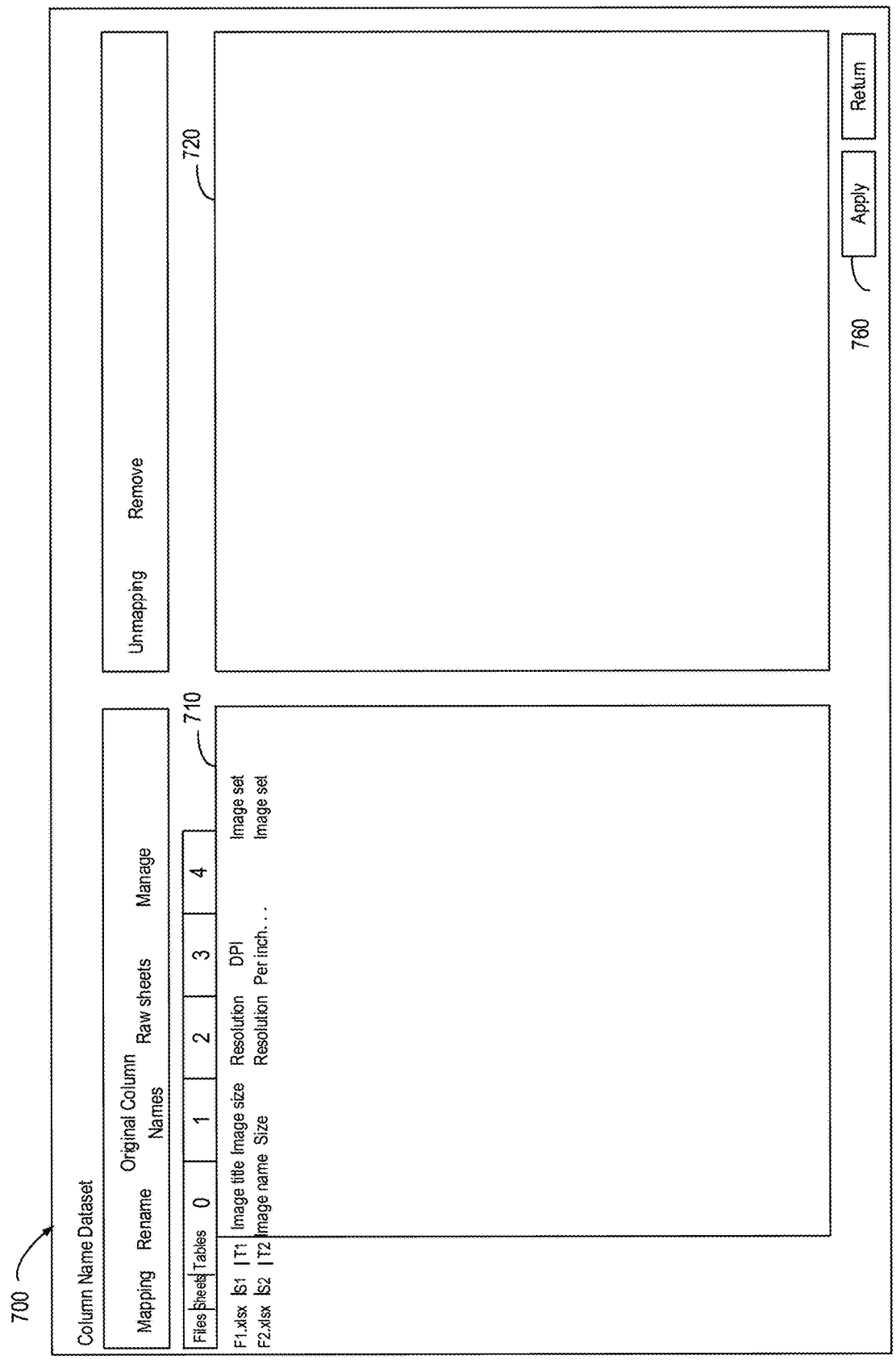
FIG. 7 shows a schematic diagram of a mapping operation interface of an application employing the mapping processing according to an embodiment of the present disclosure.

In one embodiment, the computing device 110 displays an interface 700 as shown in FIG. 7 in response to receiving the mapping initiation operation (e.g., a trigger operation from the user for a mapping initiation control (e.g., the "Mapping Tool" control 346). In one embodiment, the interface 700 may be in a form of a pop-up window and is displayed over the interface 600 as shown in FIG. 6 in a superimposed manner. In another embodiment, the interface 700 may be an interface that is skipped from the interface 600. The specific presentation form of the interface 700 is not limited in the present disclosure.

As shown in FIG. 7, an application user interface 700 as shown in FIG. 7 may include a column name management area 710 and a mapping area 720. In one embodiment, the column name groups from the tables to be merged are displayed in the column name management area 710, and each group is arranged and displayed in a column manner. For example, still taking the tables T1 and T2 shown in FIG. 4A-FIG. 4B as an example, the column name group including the column names "image title" and "image name" is displayed in the 0th column in the column name management area 710; the column name group including the column names "image size" and "size" is displayed in the 1st column, and so on.

The computing device 110 may receive a mapping operation, which is performed by the user in the column name management area 710 for the column name group to be mapped. Specifically, the computing device 110 receives, in the column name management area 710, a selection operation from the user for at least one of the first column name and the second column name. The computing device 110 determines a mapped column name for the selected column name and displays the selected column name and the determined mapped column name in the mapping area 720. In one embodiment, the selected column name and the mapped column name are displayed in the same column in the mapping area 720.

Figure 8:
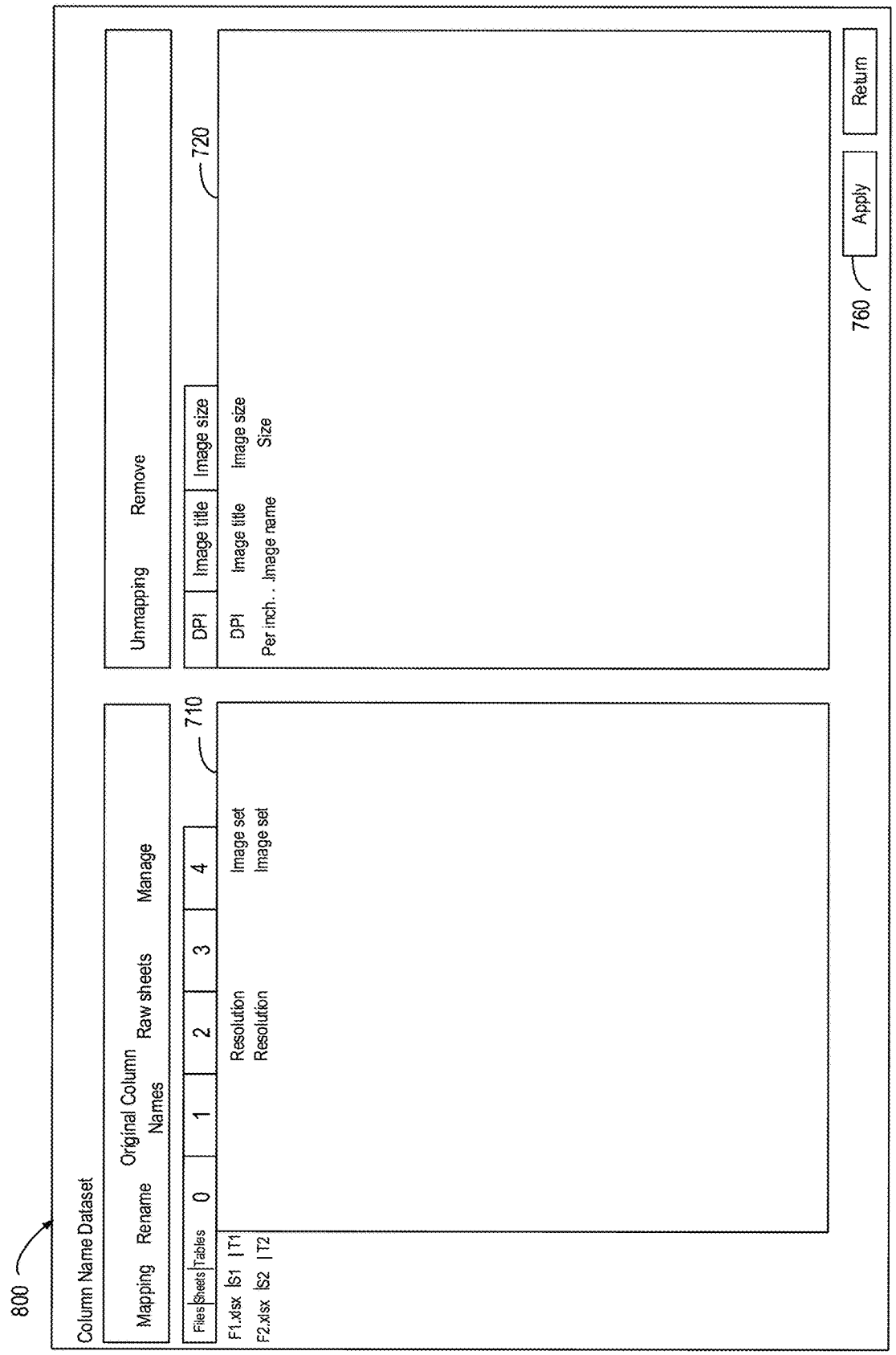
FIG. 8 shows a schematic diagram of a mapping operation interface during the use mapping processing according to an embodiment of the present disclosure.

The display and operation in the mapping area 720 may be understood in combination with FIG. 8. The computing device 110 may display the column name group and the corresponding mapped column name in the same column based on the determined mapped column name. For example, as shown in FIG. 8, in the mapping area 720, the mapped column name "image title" and the column name group including the column names "image title" and "image name" are displayed in the same column, with the mapped column name for the column name group being located in the header. Thus, the computing device 110 can prompt the user that the group of column names is mapped to the mapped column name.

The computing device 110 may determine the mapped column name for a group of column names in a number of ways. In one embodiment, for a certain group of column names, in the case where the mapped column name for one or more column names in the group has been displayed in the header area of the mapping area 720 (e.g., a column name in the group of column names has been selected as the mapped column name and displayed in the mapping area 720), when the user selects, in the column name management area 710, at least one another column name in the group for mapping, the computing device 110 may provide, e.g., in a column name setting control, an option including the mapped column name for a user's selection. Based on the received selection from the user for the mapped column name, the computing device 110 maps the at least one another column name selected by the user to the mapped column name. In addition, in one embodiment, when the user selects, in the column name management area 710, multiple column names in a certain group of column names, the computing device 110 may set the column name, which is arranged and displayed in front of the column name management area 710, in that column name group to be the mapped column name. For example, as shown in FIG. 7, when the user selects a group including the column names "image size" and "size" in the column name management area 710, the computing device 110 may determine the column name "image size", which is arranged and displayed in front of the column name management area 710, to be the mapped column name for the group. In addition, the mapped column names may also be determined in other ways, as long as a group of column names may be mapped to a consistent mapped column name. It can be understood that, the manner for determining the mapped column name is not limited in the present disclosure.

In one embodiment, multiple groups of column name are displayed in the column name management area 710 in FIG. 7. The multiple groups are obtained from multiple tables based on the received attribute settings, and the groups are displayed in the column name management area 710 in columns. Accordingly, the column names displayed in the column name management area 710 may be stored in the cache file as described in the method 200. That is, the cache file includes the groups of column name displayed in area 710 Moreover, the mapped column names in the mapping area 720 may be stored in the mapping file. That is, the computing device 110 stores the column names in respective files according to the areas where the column names are displayed.

As described in block 204 in the method 200, in response to the mapping setup operation for a group of column names, the computing device 110 generates the mapping file and the address file. In one embodiment, the mapping file stores the mapping relationship between the group of column names and the mapped column name for the group of column names. The mapping relationship may include the mapped column name to which the group of column names is mapped. In one embodiment, the mapping setup operation may include mapping-related operations as described above in combination with FIG. 7 and FIG. 8. The mapping file generated by the computing device 110 includes the mapping relationship between a group of column names and the mapped column name. In addition, the address file includes address information of the mapped column name in the cache file.

In one embodiment, the mapping file is stored in association with the address file. Specifically, the mapping file and the address file may have the same format, and respectively store the mapped column name and the address of the mapped column name in the cache file. For example, the mapping file may include a mapping table, the address file may include an address table, and the mapping table has the same format as the address table. The mapping table stores the mapped column name at a first position in the mapping table, and the address table stores the address of the mapped column name in the cache file at a second position, which corresponds to the first position. In addition, it may be understood that the mapping file and the address file may also have other formats than tables, which is not limited in the present disclosure.

In one embodiment, in response to the mapping implementation operation, the computing device 110 may output the mapped column name based on the cache file, address file, and the mapping file. Specifically, in response to the mapping implementation operation from the user (e.g., trigger of an "apply" control 760 by the user), the computing device 110 outputs, to the column name display sub-area 342 as shown in FIG. 6, the mapped each column name corresponding to each group of column names, as shown in FIG. 6.

As described above in combination with the process 200 in FIG. 2A, both the first column name $C_{name1}$ and the second column name $C_{name2}$ in a group of column names are stored in the cache file. The address information of the first column name $C_{name1}$ and the address information of the second column name $C_{name2}$ in the cache file are addr1 and addr2, respectively. In one embodiment, in response to the mapping setup operation, the computing device 110 generates a mapping file $File_{map}$, and stores, in the generated mapping file $File_{map}$, the mapping relationship of the first column name $C_{name1}$ and the second column name $C_{name2}$ with the mapped column names $C_{name}$. The first column name and the second column name are mapped to the mapped column names $C_{name}$. The computing device 110 stores, in the address file, the address information of the corresponding mapped column name in the cache file. For example, the computing device 110 determines that the mapped column name to which the first column name $C_{name1}$ and the second column name $C_{name2}$ are mapped is the first column name $C_{name1}$. Accordingly, the mapping relationship of the first column name and the second column name with the mapped column name (for example, the first column name $C_{name1}$ is determined to be the mapped column name) is stored in the mapping file, and the address addr1 of the mapped column name (in the embodiment, it is the first column name $C_{name1}$) in the cache file is stored in the address file. The mapping relationship may include the corresponding mapped column name. Upon receiving the mapping implementation operation (e.g., trigger of the "apply" control 760 performed by the user), when outputting the mapped column name, the computing device 110 determines the mapped column name $C_{name}$ according to the mapping relationship stored in the mapping file, and retrieves the mapped column name from the cache file according to the address of the mapped column name, which is stored in the address file. The computing device 110 outputs the mapped column name, accordingly.

In addition, in one embodiment, the computing device 110 may also generate a raw information file for storing original head information in each table to be merged. In response to a selection for a viewing operation from the user, the computing device 110 may display a table that is associated with the selected column name in the column name management area 710. For example, when the user selects the column name "image title" in the column name management area 710, in response to an operation for a viewing control (e.g., an "original sheet" control), the computing device 110 displays original table information of the table in which the selected column name "image title" is located. The column name, which is set to be a "common field", is highlighted or marked with an identifier, so as to prompt the user that the column name is set to be the "common field".

As described above, the technology according to the embodiment of the present disclosure may conveniently map inconsistent column names among a plurality of different tables to a consistent mapped column name. Therefore, the user does not need to manually modify the column names before merging the tables. Thus, the efficiency and speed of merging the tables has been greatly improved and the user's experience is significantly improved.

In the embodiment according to the present disclosure, acquiring the first column name and the second column name in the tables may be implemented in the following manners: the computing device 110 determines a first header of the first table T1 and a second header of the second table T2 based on attribute settings, and acquires respective groups of column names from the first header and the second header.

Taking FIG. 4A and FIG. 4B as an example, the computing device 110 may determine the first header 420 of the first table T1 and the second header 440 of the second table T2 based on the attribute settings. The header may include column names in the table. For example, the first header 420 includes column names "image title", "image size", "resolution", "DPI" and "image set". The second header 440 may include column names "image name", "size", "resolution", "dots per inch (DPI)" and "image set". The computing device 110 may acquire the column names from the headers, and group the acquired column names according to the category of the data in the column, so as to obtain the column name groups, that is, the computing device 110 groups the column names.

As shown in FIG. 5, the attribute settings may include information for the table header, including a starting row number and an ending row number of the table displayed in the table display area 330, as well as a common field (e.g., a common column name) in the tables to be merged. Accordingly, the implementation process of determining the header of each table may be described in combination with a method 900 in FIG. 9.

Figure 9:
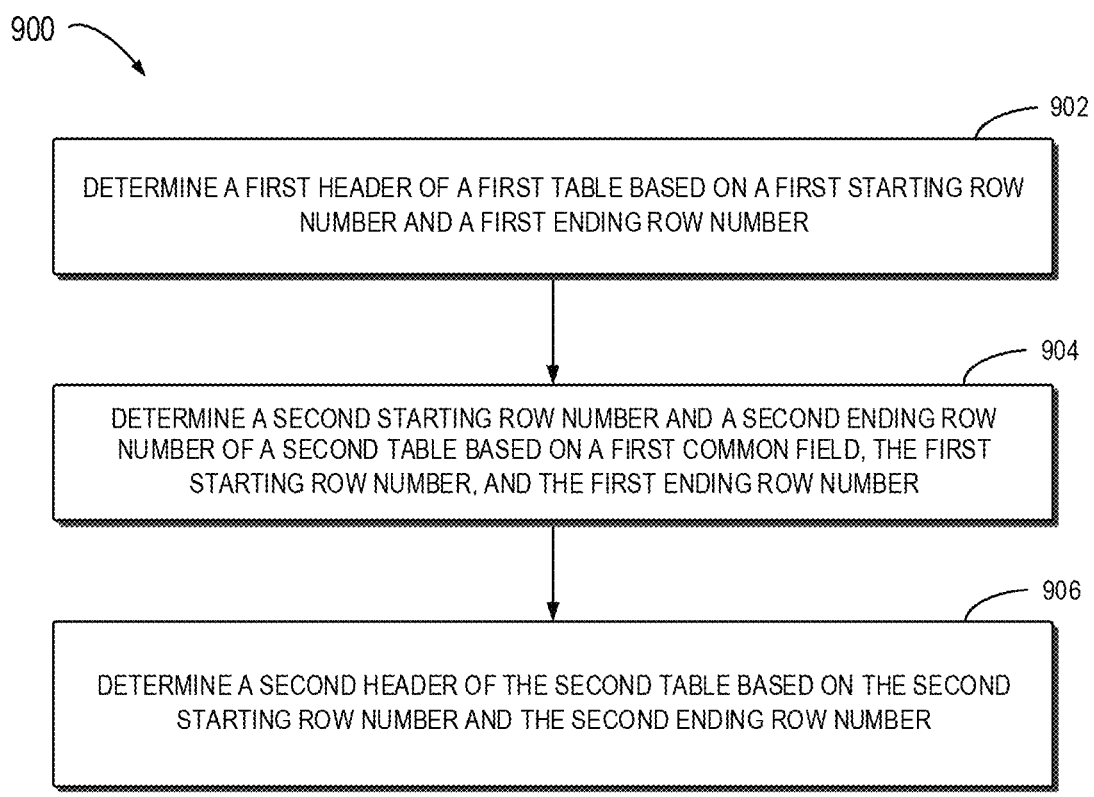
FIG. 9 shows a schematic flow diagram of determining a header of a table to be merged according to an embodiment of the present disclosure.

As shown in FIG. 9, in block 902, the computing device 110 may determine a first header based on a first starting row number and a first ending row number in the attribute settings. Taking FIG. 5 as an example, for the table as displayed in the table display area 330, the first starting row number and the first ending row number are both 1, since the table has only one layer of header, and the row number where the header is located is 1 (i.e., the first row of the sheet). Therefore, the area wherein the first row being located is a header area, and the header area includes multiple column names. The first common field "resolution" as set is located in the header area.

In block 904, the computing device 110 determines a second starting row number and a second ending row number for the second table based on the first common field, the first starting row number, and the first ending row number. The process of determining the second starting row number and the second ending row number in the second table will be described in detail below.

In block 906, the computing device 110 may determine a second header of the second table based on the second starting row number and the second ending row number. For example, the area of the table header is an area defined by the second starting row number and the second ending row number.

In one embodiment, when determining the second starting row number, the computing device 110 may traverse the first table T1 and the second table T2. The computing device 110 may generate a first index set according to the traversal and attribute setting information (i.e., attribute settings). The first index set includes a first field row number of the first common field in the first table and a second field row number of the first common field in the second table T2. The computing device 110 may generate a starting row index set and an ending row index set based on the first index set. In one embodiment, the starting row index set includes the first starting row number for the first table T1 and the starting row number for the second table T2, and the ending row index set includes the first ending row number for the first table T1 and the second ending row number for the second table T2.

When determining the starting row index set, the computing device 110 may determine a first row spacing d1 based on the first field row number and the first starting row number in the attribute setting information, and generate the starting row index set based on the first row spacing d1 and the first index set. For example, the computing device 110 may subtract the first row spacing d1 from each element in the first index set, so as to obtain the starting row index set. In addition, when determining the ending row index set, the computing device 110 may determine a second row spacing d2 based on the first field row number and the first ending row number in the attribute setting information, and generate the ending row index set based on the second row spacing d2 and the first index set. For example, the computing device 110 may add the second row spacing d2 to each element in the first index set, so as to obtain the ending row index set.

For example, the table in FIG. 10 is used as an example for description. FIG. 10 includes two tables T10 and T20, and both tables have multi-layer headers, for example, the header in each table includes two rows. It is assumed that for the table T10, the attribute settings have been set as: the first starting row number is 2, the first ending row number is 3, and the first common field (a common column name among the column names) is "resolution". The computing device 110 determines the second header of the second table T20 based on the attribute settings. Specifically, the computing device 110 may traverse the first tables T10 and T20, and generate a first index set Index1 {2,13} according to the traversal and the attribute setting information. The first index set Index1 indicates the first field row number (e.g., 2) of the common field "resolution" in the table T10 and the second field row number (e.g., 13) of the common field "resolution" in the table T20. The computing device 110 may determine, based on the first field row number and the first starting row number, that the first row spacing is 2−2=0, so d1=0. The computing device 110 may generate a starting row index StartIndex={2-0,13-0}={2,13} based on the first row spacing and the first index set Index1. When determining the ending row index EndIndex, the computing device 110 may determine, based on the first field row number and the first ending row number, that the second row spacing is 3−2=1, so d2=1. The computing device 110 may generate an ending row index set EndIndex={2+1,13+1}={3,14} based on the second row spacing and the first index set Index1. Thus, the computing device 110 may determine that the header of the table T10 is a header area determined by Row 2 and Row 3, and that the header of the table T20 is a header area determined by Row 13 and Row 14. The computing device 110 may further acquire the column name in each table from the header of the table T10 and the header of the table T20.

Although the process of determining the header is described above in combination with the two tables, it may be understood that the method according to the embodiment of the present disclosure may be applied to multiple tables. In addition, FIG. 10 shows a situation where multiple tables to be merged are stored in one sheet. It may be understood that the method according to the embodiment of the present disclosure may also be applied to a situation where multiple tables are stored in a plurality of sheets, and elements in the corresponding starting row index set and the ending row index set may carry information about the sheets where the tables are located, so as to determine the starting row and the ending row of the tables. The generation process of the starting row index set and the ending row index set is similar to the above description process, and thus will not be repeated herein for the sake of clarity.

For a single-layer header, the computing device 110 may acquire the column names of the columns. For a multi-layer header, the computing device 110 may preprocess the table header, convert the multi-layer header into a single-layer header, and acquire the column names from the converted single-layer header. The process of the computing device 110 for preprocessing the multi-layer header will be described below in combination with FIG. 11. It may be understood that the processing sequence in FIG. 11 is only schematic, and those skilled in the art may implement the processing on the multi-layer header by using a processing sequence different from that shown in FIG. 11.

Figure 11:
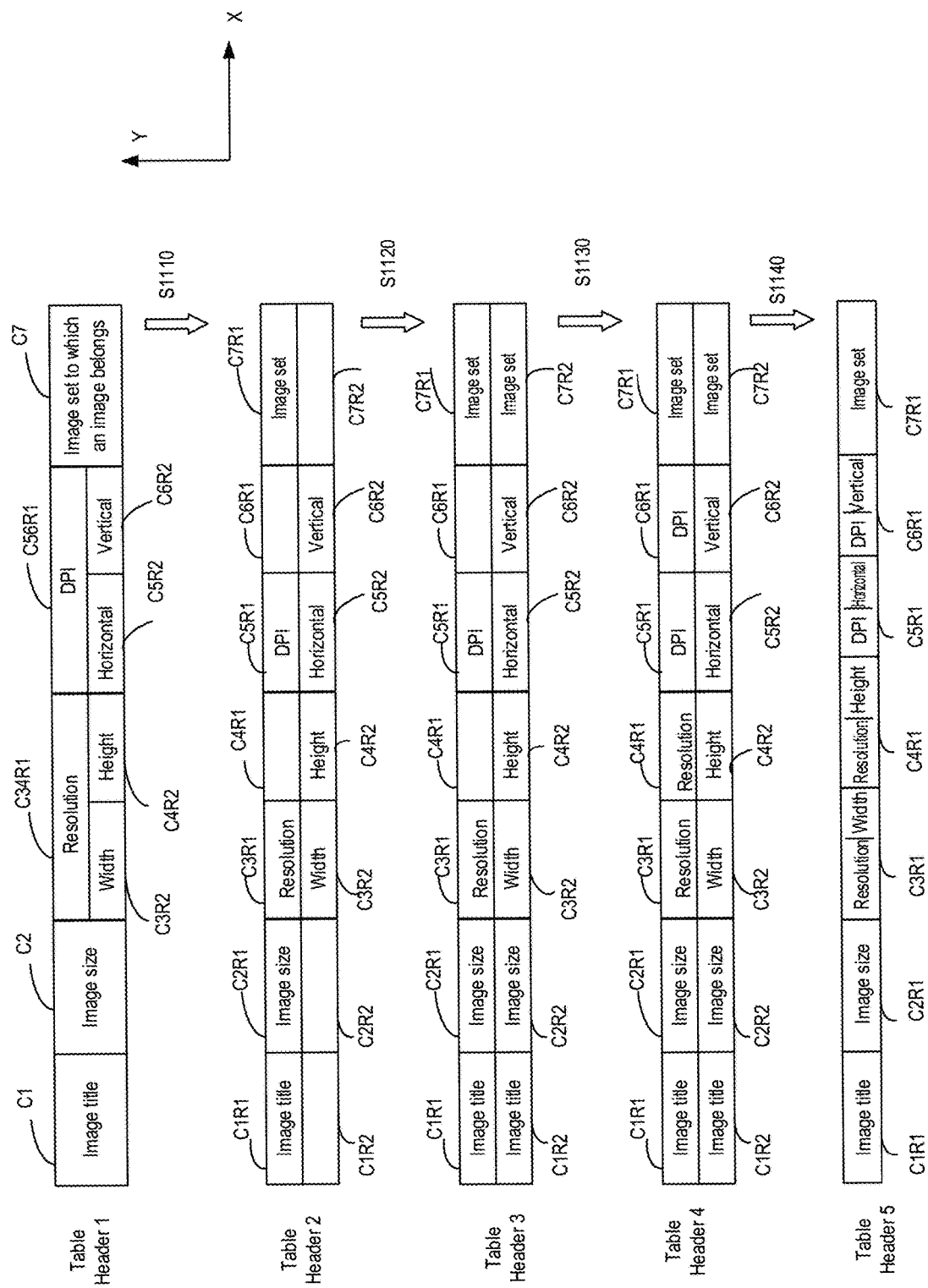
FIG. 11 shows a schematic process of acquiring a column name from a multi-layer header according to an embodiment of the present disclosure.

As shown in FIG. 11, when the computing device 110 extracts the column names from the table, for a multi-layer header (e.g., a header 1 in FIG. 11 has a two-layer header, the two-layer header occupies two rows, and the header 1 includes merged cells C1, C2, and C7), the computing device 110 splits the merged cells in the header 1 (S1110). In one embodiment, the computing device 110 may split the merged cells according the merging direction of the cells. For example, for the cell C1, when the cell C1 is merged in a first direction (e.g., a Y-axis direction), the computing device 110 splits the C1 in the first direction (e.g., the Y-axis direction). Similarly, for a cell C34R1 merged in a second direction (e.g., an X-axis direction), the computing device 110 may split the cell C34R1 in the second direction (e.g., the X-axis direction), accordingly. As shown in FIG. 11, after being split, the header 1 is converted to a header 2. In the header 2, the merged cell in the header 1 is split into multiple split cells, and the split cells correspond to respective columns, for example, the merged cell C1 in the header 1 is split into two split cells C1R1 and C1R2.

Each row in the split header has multiple cells corresponding to the columns of the table, respectively. For example, as shown in the table header 2, the first row has cells corresponding to various columns, for example, cells C1R1, C2R1, C3R1, C4R1, C5R1, C6R1 and C7R1. It may be understood that, in the process of splitting and merging the cells, blank cells may appear during the process. As shown in the table 2, the cells C1R2, C2R2, C4R1, C6R1 and C7R2 are blank. The computing device 110 may fill the blank cells with a field in an adjacent cell of the blank cell, thereby obtaining filled table headers. In one embodiment, the computing device 110 may fill the blank cells with respective adjacent cells according to the direction of the cells being split. For example, the computing device 110 may fill the blank cells, which are split in the first direction, with fields in the adjacent cells of the blank cells in the first direction, as shown in S1120 in FIG. 11. For the blank cells C1R2, C2R2 and C7R2 that are split in the first direction (e.g., the Y-axis direction), the computing device 110 fills the blank cells with the fields in the adjacent cells of the blank cells in the first direction. For example, for the blank cell C1R2, the computing device 110 fills the blank cell C1R2 with the field "image title" in the adjacent cell C1R1 in the first direction (the Y-axis direction). The computing device 110 similarly fills the blank cells C2R2 and C7R2 to obtain a table header that is filled in the first direction, for example, as shown in a table header 3 in FIG. 11.

Afterwards, the computing device 110 may fill the blank cells, which are split in the second direction, with fields in adjacent cells of the blank cells in the second direction, as shown in S1130 in FIG. 11. For blank cells C4R1 and C6R1 that are split in the second direction (e.g., the X-axis direction), the computing device 110 fills the blank cells with fields in the adjacent cells of the blank cells in the second direction. For example, for the blank cell C4R1, the computing device fills the blank cell C4R1 with the field "resolution" in an adjacent cell C3R1 in the second direction (the X-axis direction). The computing device 110 similarly fills the blank cell C6R1 to obtain a header that is filled in the second direction, for example, as shown in a header 4 in FIG. 11.

After the filling operations in S1120 and S1130 as above, each cell in the header is filled. For the filled table header (e.g., the table header 4), the computing device 110 executes a compression operation on the filled header (e.g., S1140), so as to obtain a compressed table header (e.g., a table header 5). The compressed header occupies one row in the table. In one embodiment, the computing device 110 compresses the header in the first direction (e.g., the Y-axis direction), and the computing device 110 adjusts the fields in the cells in the compressed header during the compression process. The fields in the adjusted cells correspond to the column names in the table where the table header is located, and thus are used to obtain the column names in the table. When adjusting the fields in the cells, the computing device 110 may determine whether the fields in multiple cells in the first direction are consistent, and if so, use the consistent field as the field of the compressed cells; and if not, the computing device 110 combines the fields in each of the cells, and separates the fields by identifiers such as a "vertical line" (a vertical line identifier may indicate that the column name comes from the multi-layer header), so as to obtain the adjusted fields. As shown in FIG. 11, in a table header 5, the fields in the cells C1R1 and C1R2 are consistent, so the field in the compressed cell C1R1 is "image title"; and the fields in the cells C3R1 and C3R2 are respectively "resolution" and "width", which are inconsistent fields, and accordingly, the computing device 110 combines "resolution" with "width" in the compressed cell C3R1, and use a vertical line to distinguish them, as shown in FIG. 11. After obtaining the compressed header, the computing device 110 may obtain the column names of each table from the compressed header.

By means of the above manner, the data processing method according to the embodiment of the present disclosure may merge tables having multi-layer headers and inconsistent column names in the headers, thereby greatly improving the application potential of the merged table. The user does not need to manually process the headers of various types of formats (e.g., modify and unify the column names) before merging the tables, therefore, the efficiency and speed of merging the tables can be greatly improved, and the operating user's experience can be significantly improved.

Figure 12:
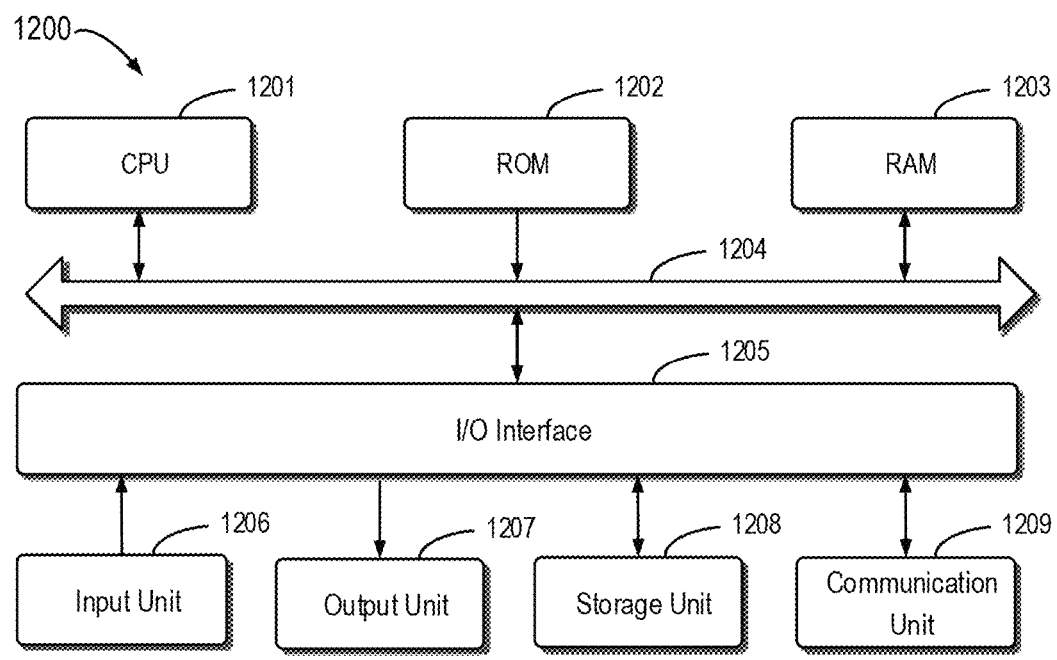
FIG. 12 shows a schematic block diagram of an example device of an embodiment that may be used to implement the content of the present disclosure.

FIG. 12 shows a schematic block diagram of an example device 1200 of an embodiment that may be used to implement the content of the present disclosure. For example, a computing device 1210 according to the embodiment of the present disclosure may be implemented by the device 1200. As shown in the figure, the device 1200 includes a central processing unit (CPU) or graphics processing unit (GPU) 1201, which may execute various appropriate actions and processing according to computer program instructions stored in a read-only memory (ROM) 1202 or computer program instructions that are loaded from a storage unit 1208 into a random access memory (RAM) 1203. In the RAM 1203, various programs and data necessary for the operations of the device 1200 may also be stored. The CPU/GPU 1201, the ROM 1202 and the RAM 1203 are connected to each other by means of a bus 1204. An input/output (I/O) interface 1205 is also connected to the bus 1204.

A plurality of components in the device 1200 are connected to the I/O interface 1205, including: an input unit 1206, such as a keyboard and a mouse; an output unit 1207, such as various types of displays and loudspeakers; a storage unit 1208, such as a magnetic disk and an optical disk; and a communication unit 1209, such as a network card, a modem and a wireless communication transceiver. The communication unit 1209 allows the device 1200 to exchange information/data with other devices by means of a computer network such as the Internet and/or various telecommunication networks.

The various processes and processing described above, for example, the processes 200 and/or 900, may be executed by the processing unit 1201. For example, in some embodiments, the method processes 200 and/or 900 may be implemented as computer software programs, which are tangibly embodied in a machine-readable medium, such as the storage unit 1208. In some embodiments, part or all of the computer programs may be loaded and/or installed on the device 1200 via the ROM 1202 and/or the communication unit 1209. When the computer programs are loaded into the RAM 1203 and executed by the CPU/GPU 1201, one or more actions of the processes 200 and/or 900 described above may be executed.

The present disclosure may be a method, an apparatus, a system and/or a computer program product. The computer program product may include a computer-readable storage medium having computer-readable program instructions loaded thereon for executing various aspects of the present disclosure.

The computer-readable storage medium may be a tangible device that may hold and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination of the foregoing devices. More specific examples (non-exhaustive list) of the computer-readable storage medium include: a portable computer disk, a hard disk, a random access memory (RAM), a read-only memory (ROM), an erasable programmable read-only memory (EPROM) or flash memory), a static random access memory (SRAM), a portable compact disk read-only memory (CD-ROM), a digital versatile disk (DVD), a memory stick, a floppy disk, a mechanical encoding device, such as protrusion structures in punched cards or grooves with instructions stored thereon, and any suitable combinations thereof. The computer-readable storage medium, as used herein, is not to be interpreted as a transient signal per se, such as radio waves or other freely propagating electromagnetic waves, electromagnetic waves propagating via waveguides or other transmission media (e.g., light pulses propagating via optical fiber cables), or electrical signals transmitted via electrical wires.

The flow diagrams and block diagrams in the drawings illustrate system architectures, functions and operations that may be implemented by the systems, methods and computer program products according to a plurality of embodiments of the present disclosure. In this regard, each block in the flow diagrams or block diagrams may represent a module, and a part of a program segment or instruction, and the module and the part of the program segment or instruction contains one or more executable instructions for implementing specified logical functions. In some alternative implementations, the functions annotated in the boxes may also occur in a different order from those annotated in the drawings. For example, two consecutive blocks may, in fact, be executed substantially in parallel, and may also be executed in a reverse order sometimes, depending upon the functions involved. It is also noted that, each block in the block diagrams and/or flow diagrams, and combinations of the blocks in the block diagrams and/or flow diagrams may be implemented by dedicated hardware-based systems, which are used for executing the specified functions or actions, or may be implemented in a combination of dedicated hardware and computer instructions.

Embodiments of the present disclosure may at least provide the following Clauses.

Clause 1. A method for processing data, including:
acquiring a group of column names from a plurality of tables based on received attribute setting information, wherein the group of column names is stored in a cache file;
generating a mapping file and an address file in response to a mapping setup operation for the group of column names, wherein the mapping file stores a mapping relationship between the group of column names and a mapped column name for the group of column names, and the address file stores an address of the mapped column name in the cache file; and
in response to a mapping implementation operation, outputting the mapped column name based on the mapping file, the address file, and the cache file.

Clause 2. The method according to clause 1, wherein the group of column names includes a first column name in a first table and a second column name in a second table, and the first column name is different from the second column name.

Clause 3. The method according to clause 1, wherein the format of the mapping file is the same as that of the address file, and wherein the mapping file and the address file store the mapped column name and the address of the mapped column name in the cache file, respectively.

Clause 4. The method according to clause 1, wherein outputting the mapped column names includes:
determining the mapped column name according to the mapping relationship stored in the mapping file;
retrieving the mapped column name from the cache file based on the address of the mapped column name stored in the address file; and
outputting the mapped column name.

Clause 5. The method according to clause 2, wherein the mapping setup operation includes:
receiving a selection operation for at least one of the first column name and the second column name;
determining the mapped column name for the selected column name; and
displaying the selected column name in a mapping area, wherein, in the mapping area, the selected column name and the mapped column name are displayed in the same column.

Clause 6. The method according to clause 5, wherein the mapped column name is derived from at least one of the following:
a column name that exists in the mapping area and selected by a user; and
a default column name in the group of column names.

Clause 7. The method according to clause 1, wherein the group of column names includes a first column name in a first table and a second column name in a second table, the method further includes:
in response to a merging operation, merging the first table and the second table based on the mapped column name; and
outputting a merged table.

Clause 8. The method according to clause 7, wherein merging the first table and the second table includes:
based on the mapped column name, acquiring a first column corresponding to the first column name in the first table;
based on the mapped column name, acquiring a second column corresponding to the second column name in the second table; and
merging the first column and the second column to obtain a merged column,
wherein a column name of the merged column is the mapped column name.

Clause 9. The method according to clause 1, wherein the group of column names includes a first column name in a first table and a second column name in a second table, the method further includes:
determining, based on the attribute setting information, a first header of the first table and a second header of the second table; and
acquiring the first column name from the first header; and
acquiring the second column name from the second header.

Clause 10. The method according to clause 9, wherein the attribute setting information includes: a first starting row number and a first ending row number for the first table, and a first common field between column names in the first table and column names in the second table.

Clause 11. The method according to clause 10, wherein determining the first header of the first table and the second header of the second table includes:
determining the first header based on the first starting row number and the first ending row number;
determining a second starting row number and a second ending row number for the second table based on the first common field, the first starting row number, and the first ending row number; and
determining the second header of the second table based on the second starting row number and the second ending row number.

Clause 12. The method according to clause 11, wherein determining the second starting row number and the second ending row number for the second table includes:
traversing the first table and the second table; and
generating a first index set according to the traversal and the attribute setting information, wherein the first index set includes a first field row number of the first common field in the first table and a second field row number of the first common field in the second table; and
generating, based on the first index set, a starting row index set and an ending row index set,
wherein the starting row index set includes the first starting row number for the first table and the second starting row number for the second table, and the ending row index set includes the first ending row number for the first table and the second ending row number for the second table.

Clause 13. The method according to clause 12, wherein generating the starting row index set includes:
  determining a first row spacing based on the first field row number and the first starting row number; and
  generating the starting row index set based on the first row spacing and the first index set.

Clause 14. The method according to clause 12, wherein generating the ending row index set includes:
  determining a second row spacing based on the first field row number and the ending row number; and
  generating the ending row index set based on the second row spacing and the first index set.

Clause 15. The method according to clause 11, further including:
  determining the first header and the second header according to the starting row index set and the ending row index set;
  acquiring the first column name in the first table based on the first header; and
  acquiring the second column name in the second table based on the second header.

Clause 16. The method according to clause 15, wherein the first header includes a plurality of rows, and the second header includes a plurality of rows, the method further includes:
  splitting merged cells in the first header and merged cells the second header, respectively, wherein each row in the first split header comprises a first plurality of cells corresponding to the columns in the first table, and each row in the second split header comprises a second plurality of cells corresponding to the columns in the second table;
  filling a first blank cell of the first plurality of cells with a first field in a first adjacent cell of the first blank cell, to obtain a first filled header;
  filling a second blank cell of the second plurality of cells with a second field in a second adjacent cell of the second blank cell, to obtain a second filled header
  compressing the filled first header to acquire the first column name in the first table; and
  compressing the filled second header to acquire the second column name in the second table.

Clause 17. A computing device, including:
  at least one processing unit; and
  at least one memory, the at least one memory being coupled to the at least one processing unit and storing instructions executed by the at least one processing unit, and when executed by the at least one processing unit, the instructions causing the computing device to execute the method according to any of clauses 1-16.

Clause 18. A computer-readable storage medium, including machine-executable instructions, wherein when executed by a device, the machine-executable instructions cause the device to execute the method according to any of clauses 1-16.

Clause 19. A computer program product, including machine-executable instructions, wherein when executed by a device, the machine-executable instructions cause the device to execute the method according to any of clauses 1-16.

Clause 20. A method, including:
  acquiring a first table and a second table;
  determining a first header of the first table and a second header of the second table based on received attribute setting information;
  acquiring a group of column names from the first header and the second header,
  wherein the group of column names includes a first column name in the first table and a second column name in the second table;
  mapping the group of column names to a mapped column name;
  merging the first table and the second table based on the mapped column name; and
  outputting a merged table.

Clause 21. The method according to clause 20, wherein the first column name is different from the second column name.

Clause 22. The method according to clause 20, wherein merging the first table and the second table includes:
  based on the mapped column name, acquiring a first column corresponding to the first column name in the first table;
  based on the mapped column name, acquiring a second column corresponding to the second column name in the second table; and
  merging the first column and the second column to obtain a merged column,
  wherein a column name of the merged column is the mapped column name.

Clause 23. The method according to clause 20, further including:
  displaying a column name management area and a mapping area in response to a mapping initiation operation, wherein the group of column names is displayed in the column name management area;
  receiving, in the column name management area, a selection operation for at least one of the first column name and the second column name;
  determining the mapped column name for the selected column name; and
  displaying the selected column name in the mapping area, wherein the selected column name and the mapped column name are displayed in the same column in the mapping area.

Clause 24. The method according to clause 23, wherein the mapped column name is derived from at least one of the following:
  a column name that exists in the mapping area and is selected by a user; or
  a default column name in the group of column names.

Clause 25. The method according to clause 20, wherein the attribute setting information includes a first common field between column names in the first header and column names in the second header, and the method further includes:
  displaying the mapped column name along with the first common field in a common column name area in an application user interface.

Clause 26. The method according to clause 25, further including:
  acquiring a second group of column names, wherein the second group of column names includes a third column name in the first table and a fourth column name in the second table, and the third column name is different from the fourth column name; and
  displaying the second group of column names in a non-common column name area in the application user interface.

Clause 27. The method according to clause 20, wherein the attribute setting information includes: a first starting row number and a first ending row number for the first table, and a first common field between column names in the first table and column names in the second table.

Clause 28. The method according to clause 27, wherein determining the first header of the first table and the second header of the second table includes:
  determining the first header of the first table based on the first starting row number and the first ending row number;
  determining a second starting row number and a second ending row number for the second table based on the first common field, the first starting row number and the first ending row number; and
  determining the second header of the second table based on the second starting row number and the second ending row number.

Clause 29. The method according to clause 28, wherein determining the second starting row number and the second ending row number for the second table includes:
  traversing the first table and the second table; and
  generating a first index set according to the traversal and the attribute setting information, wherein the first index set includes a first field row number of the first common field in the first table and a second field row number of the first common field in the second table; and
  generating a starting row index set and an ending row index set based on the first index set,
  wherein the starting row index set includes the first starting row number for the first table and the second starting row number for the second table, and the ending row index set includes the first ending row number for the first table and the second ending row number for the second table.

Clause 30. The method according to clause 29, wherein generating the starting row index set includes:
  determining a first row spacing based on the first field row number and the first starting row number; and
  generating the starting row index set based on the first row spacing and the first index set.

Clause 31. The method according to clause 29, wherein generating the ending row index set includes:
  determining a second row spacing based on the first field row number and the ending row number; and
  generating the ending row index set based on the second row spacing and the first index set.

Clause 32. The method according to clause 29, further including:
  determining the first header and the second header according to the starting row index set and the ending row index set;
  acquiring the first column name in the first table based on the first header; and
  acquiring the second column name in the second table based on the second header.

Clause 33. The method according to clause 32, wherein the first header includes a plurality of rows, and the second header includes a plurality of rows, the method further includes:
  splitting merged cells in the first header and merged cells the second header, respectively, wherein each row in the first split header comprises a first plurality of cells corresponding to the columns in the first table, and each row in the second split header comprises a second plurality of cells corresponding to the columns in the second table;
  filling a first blank cell of the first plurality of cells with a first field in a first adjacent cell of the first blank cell, to obtain a first filled header;
  filling a second blank cell of the second plurality of cells with a second field in a second adjacent cell of the second blank cell, to obtain a second filled header;
  compressing the first filled header to acquire the first column name in the first table; and
  compressing the second filled header to acquire the second column name in the second table.

Clause 34. A computing device, including:
  at least one processing unit; and
  at least one memory, the at least one memory being coupled to the at least one processing unit and storing instructions executed by the at least one processing unit, and when executed by the at least one processing unit, the instructions causing the computing device to execute the method according to any of clauses 20-33.

Clause 35. A computer-readable storage medium, including machine-executable instructions, wherein when executed by a device, the machine-executable instructions cause the device to execute the method according to any of clauses 20-33.

Clause 36. A computer program product, including machine-executable instructions, wherein when executed by a device, the machine-executable instructions causes the device to execute the method according to any of clauses 20-33.

Clause 37. A method, including:
  receiving and displaying a plurality of attribute settings;
  displaying the attribute settings in a setting area in an application user interface, wherein the attribute settings include a first common column name between column names in a first table and column names in a second table;
  based on the attribute settings, displaying the first common column name in a first sub-area of a column name display area in the application user interface, and displaying a group of column names in a second sub-area of the column name display area, wherein the group of column names includes a first column name in the first table and a second column name in the second table;
  mapping the group of column names to a mapped column name in response to a mapping operation;
  simultaneously displaying the first common column name and the mapped column name in the first sub-area;
  merging the first table and the second table based on the mapped column name; and
  outputting a merged table.

Clause 38. The method according to clause 37, wherein the first column name is different from the second column name.

Clause 39. The method according to clause 37, wherein obtaining the merged table includes:
  based on the mapped column name, acquiring a first column corresponding to the first column name in the first table;
  based on the mapped column name, acquiring a second column corresponding to the second column name in the second table; and
  merging the first column and the second column to obtain a merged column,
  wherein a column name of the merged column includes the mapped column name.

Clause 40. The method according to clause 37, further including:
 displaying a pop-up window in response to an initiation of the mapping operation, wherein the pop-up window includes a column name management area and a mapping area; and
 displaying the group of column names in the column name management area.

Clause 41. The method according to clause 40, further including:
 receiving, in the column name management area, a selection operation for at least one of the first column name and the second column name;
 determining the mapped column name for the selected column name; and
 displaying the selected column name in the mapping area, wherein the selected column name and the mapped column name are displayed in the same column in the mapping area.

Clause 42. The method according to clause 41, wherein when the mapped column name is displayed in the mapping area, determining the mapped column name for the selected column name includes:
 providing an option that includes the mapped column name; and
 determining a selected column name as the mapped column name,
 wherein the mapped column name is selected from the group of column names.

Clause 43. The method according to clause 41, further including:
 in response to a simultaneous selection of the first column name and the second column name, determining a column name that is displayed in front of the column name management area as the mapped column name.

Clause 44. The method according to clause 41, further including:
 displaying the group of column names and the mapped column name in the mapping area of the pop-up window, without displaying the group of column names and the mapped column name in the column name management area.

Clause 45. The method according to clause 41, further including:
 in response to a selection operation for a viewing operation, displaying a table associated with the selected column name in the column name management area.

Clause 46. The method according to clause 37, wherein the application user interface further includes a table display area and an identifier display area, and the method includes:
 in response to a selection operation for a table identifier, displaying a table associated with the table identifier in the table display area,
 wherein the table identifier is displayed in the identifier display area.

Clause 47. The method according to clause 46, wherein the first common column name in the attribute settings is identified in the table display area.

Clause 48. A computing device, including:
 at least one processing unit; and
 at least one memory, the at least one memory being coupled to the at least one processing unit and storing instructions executed by the at least one processing unit, and when executed by the at least one processing unit, the instructions causing the computing device to execute the method according to any of clauses 37-47.

Clause 49. A computer-readable storage medium, including machine-executable instructions, wherein when executed by a device, the machine-executable instructions cause the device to execute the method according to any of clauses 37-47.

Clause 50. A computer program product, including machine-executable instruction, wherein when executed by a device, the machine-executable instructions cause the device to execute the method according to any of clauses 37-47.

Various embodiments of the present disclosure have been described above, and the foregoing descriptions are exemplary, not exhaustive, and are not limited the various disclosed embodiments. Numerous modifications and variations will be apparent to those skilled in the art without departing from the scope and spirit of the various described embodiments. The terms used herein are chosen to best explain the principles of the various embodiments, practical applications or improvements over the arts in the marketplace, or to enable others of ordinary skill in the art to understand the various embodiments disclosed herein.

We claim:

1. A method, comprising:
 acquiring one or more source files, wherein the one or more source files include at least a first table and a second table;
 acquiring attribute setting information, wherein the attribute setting information includes a setting starting row number, a setting ending row number and a common field between column names in the first table and the second table;
 determining a starting row spacing based on the setting starting row number and a field row number of the common field;
 determining an ending row spacing based on the setting ending row number and the field row number of the common field;
 generating a common field index set based on the common field by traversing the one or more source files, wherein the common field index set includes at least a first field row number of the common field in the first table and a second field row number of the common field in the second table;
 generating a starting row index set based on the common field index set and the starting row spacing, wherein the starting row index set includes a first starting row number of the first table and a second starting row number of the second table;
 generating an ending row index set based on the common field index set and the ending row spacing, wherein the ending row index set includes a first ending row number of the first table and a second ending row number of the second table;
 determining a first header of the first table and a second header of the second table based on the starting row index set and the ending row index set;
 acquiring a group of column names from the first header and the second header, wherein the group of column names includes a first column name associated with the first table and a second column name associated with the second table;
 displaying a column name management area and a mapping area in response to a mapping initiation operation, wherein the group of column names is displayed in the column name management area;

receiving, in the column name management area, a selection for at least one of the first column name and the second column name;
determining a mapped column name for the selected column name;
displaying the selected column name in the mapping area, wherein the selected column name and the mapped column name are displayed in the same column in the mapping area;
mapping the group of column names to the mapped column name;
merging the first table and the second table based on the mapped column name; and
outputting a merged table.

2. The method of claim 1, wherein the first column name is different from the second column name.

3. The method of claim 1, wherein merging the first table and the second table comprises:
acquiring a first column corresponding to the first column name in the first table based on the mapped column name;
acquiring a second column corresponding to the second column name in the second table based on the mapped column name; and
merging the first column and the second column to obtain a merged column,
wherein a column name of the merged column includes the mapped column name.

4. The method of claim 1, wherein the mapped column name is derived from at least one of the following:
a column name that exists in the mapping area and selected by a user; and
a default column name set from the group of column names.

5. The method of claim 1, comprising:
displaying the mapped column name along with the common field in a common column name area in an user interface of an application.

6. The method of claim 5, further comprising:
acquiring a second group of column names, wherein the second group of column names includes a third column name in the first table and a fourth column name in the second table, and the third column name is different from the fourth column name; and
displaying the second group of column names in a non-common column name area in the user interface of the application.

7. The method of claim 1, wherein generating the starting row index set comprises:
generating a starting row index based on a common field index in the common field index set and the starting row spacing; and
adding the starting row index into the starting row index set.

8. The method of claim 1, wherein generating the ending row index set comprises:
generating an ending row index based on a common field index in the common field index set and the ending row spacing; and
adding the ending row index into the ending row index set.

9. The method of claim 1, wherein acquiring the group of column names further comprises:
acquiring the first column name in the first table based on the first header; and
acquiring the second column name in the second table based on the second header.

10. The method of claim 9, wherein the first header comprises a plurality of rows, and the second header comprises a plurality of rows, and the method further comprises:
splitting merged cells in the first header and merged cells the second header, respectively, wherein each row in the first split header includes a first plurality of cells corresponding to the columns in the first table, and each row in the second split header includes a second plurality of cells corresponding to the columns in the second table;
filling a first blank cell of the first plurality of cells with a first field in a first adjacent cell of the first blank cell, to obtain a first filled header;
filling a second blank cell of the second plurality of cells with a second field in a second adjacent cell of the second blank cell, to obtain a second filled header;
compressing the first filled header to acquire the first column name associated with in the first table; and
compressing the second filled header to acquire the second column name associated with the second table.

11. A computing device, comprising:
at least one processing unit; and
at least one memory, the at least one memory being coupled to the at least one processing unit and storing instructions executed by the at least one processing unit, and when executed by the at least one processing unit, the instructions causing the computing device to:
acquire one or more source files, wherein the one or more source files include at least a first table and a second table;
acquire attribute setting information, wherein the attribute setting information includes a setting starting row number, a setting ending row number and a common field between column names in the first table and the second table;
determine a starting row spacing based on the setting starting row number and a field row number of the common field;
determine an ending row spacing based on the setting ending row number and the field row number of the common field;
generate a common field index set based on the common field by traversing the one or more source files, wherein the common field index set includes at least a first field row number of the common field in the first table and a second field row number of the common field in the second table;
generate a starting row index set based on the common field index set and the starting row spacing, wherein the starting row index set includes a first starting row number of the first table and a second starting row number of the second table;
generate an ending row index set based on the common field index set and the ending row spacing, wherein the ending row index set includes a first ending row number of the first table and a second ending row number of the second table;
determine a first header of the first table and a second header of the second table based on the starting row index set and the ending row index set;
acquire a group of column names from the first header and the second header, wherein the group of column names includes a first column name associated with the first table and a second column name associated with the second table, wherein the first column name is different from the second column name;

display a column name management area and a mapping area in response to a mapping initiation operation, wherein the group of column names is displayed in the column name management area;
receive, in the column name management area, a selection for at least one of the first column name and the second column name;
determine a mapped column name for the selected column name;
display the selected column name in the mapping area, wherein the selected column name and the mapped column name are displayed in the same column in the mapping area;
map the group of column names to the mapped column name;
merge the first table and the second table based on the mapped column name; and
output a merged table.

12. The computing device of claim 11, the instructions, when executed by the at least one processing unit, causing the computing device to:
display the mapped column name along with the common field in a common column name area in an user interface of an application.

13. The computing device of claim 11, wherein merging the first table and the second table comprises:
acquiring a first column corresponding to the first column name in the first table based on the mapped column name;
acquiring a second column corresponding to the second column name in the second table based on the mapped column name; and
merging the first column and the second column to obtain a merged column,
wherein a column name of the merged column includes the mapped column name.

14. The computing device of claim 11, wherein generating the starting row index set comprises:
generating a starting row index based on a common field index in the common field index set and the starting row spacing; and
adding the starting row index into the starting row index set.

15. The computing device of claim 11, wherein generating the ending row index set comprises:
generating an ending row index based on a common field index in the common field index set and the ending row spacing; and
adding the ending row index into the ending row index set.

16. The computing device of claim 11, wherein acquiring the group of column names comprises:
acquiring the first column name in the first table based on the first header; and
acquiring the second column name in the second table based on the second header.

17. The computing device of claim 16, wherein the first header comprises a plurality of rows, the second header comprises a plurality of rows, and the instructions, when executed by the at least one processing unit, cause the computing device to:
split merged cells in the first header and merged cells the second header, respectively,
wherein each row in the first split header includes a first plurality of cells corresponding to the columns in the first table, and each row in the second split header includes a second plurality of cells corresponding to the columns in the second table;
fill a first blank cell of the first plurality of cells with a first field in a first adjacent cell of the first blank cell, to obtain a first filled header;
fill a second blank cell of the second plurality of cells with a second field in a second adjacent cell of the second blank cell, to obtain a second filled header;
compress the first filled header to acquire the first column name in the first table; and
compress the second filled header to acquire the second column name in the second table.

18. A computer-readable storage medium, including machine-executable instructions, when executed by a device, the machine-executable instruction causing the device to:
acquire one or more source files, wherein the one or more source files include at least a first table and a second table;
acquire attribute setting information, wherein the attribute setting information includes a setting starting row number, a setting ending row number and a common field between column names in the first table and the second table;
determine a starting row spacing based on the setting starting row number and a field row number of the common field;
determine an ending row spacing based on the setting ending row number and the field row number of the common field;
generate a common field index set based on the common field by traversing the one or more source files, wherein the common field index set includes at least a first field row number of the common field in the first table and a second field row number of the common field in the second table;
generate a starting row index set based on the common field index set and the starting row spacing, wherein the starting row index set includes a first starting row number of the first table and a second starting row number of the second table;
generate an ending row index set based on the common field index set and the ending row spacing, wherein the ending row index set includes a first ending row number of the first table and a second ending row number of the second table;
determine a first header of the first table and a second header of the second table based on the starting row index set and the ending row index set;
acquire a group of column names from the first header and the second header, wherein the group of column names includes a first column name associated with the first table and a second column name associated with the second table, wherein the first column name is different from the second column name;
display a column name management area and a mapping area in response to a mapping initiation operation, wherein the group of column names is displayed in the column name management area;
receive, in the column name management area, a selection for at least one of the first column name and the second column name;
determine a mapped column name for the selected column name;

display the selected column name in the mapping area, wherein the selected column name and the mapped column name are displayed in the same column in the mapping area;
map the group of column names to the mapped column name;
merge the first table and the second table based on the mapped column name; and
output a merged table.

* * * * *